(12) United States Patent
Rao

(10) Patent No.: US 8,215,392 B2
(45) Date of Patent: Jul. 10, 2012

(54) GAS-ASSISTED GRAVITY DRAINAGE (GAGD) PROCESS FOR IMPROVED OIL RECOVERY

(75) Inventor: Dandina N. Rao, Baton Rouge, LA (US)

(73) Assignee: Board of Supervisors of Louisiana State University And Agricultural and Mechanical College, Baton Rouge, LA (US)

( * ) Notice: Subject to any disclaimer, the term of this patent is extended or adjusted under 35 U.S.C. 154(b) by 57 days.

(21) Appl. No.: 11/399,831

(22) Filed: Apr. 7, 2006

(65) Prior Publication Data
US 2006/0289157 A1    Dec. 28, 2006

Related U.S. Application Data

(60) Provisional application No. 60/669,489, filed on Apr. 8, 2005.

(51) Int. Cl.
*E21B 43/16*    (2006.01)
(52) U.S. Cl. .......................................... 166/268; 166/50
(58) Field of Classification Search .................. None
See application file for complete search history.

(56) References Cited

U.S. PATENT DOCUMENTS

| | | | | |
|---|---|---|---|---|
| 3,653,438 A * | 4/1972 | Wagner | .......... | 166/266 |
| 4,042,029 A | 8/1977 | Offeringa | .......... | 166/401 |
| 4,067,391 A * | 1/1978 | Dewell | .......... | 166/303 |
| 4,441,984 A * | 4/1984 | Guerre | .......... | 208/401 |
| 4,589,486 A | 5/1986 | Brown et al. | .......... | 166/252 |
| 4,678,036 A * | 7/1987 | Hartman et al. | .......... | 166/403 |
| 4,679,627 A * | 7/1987 | Harrison | .......... | 166/249 |
| 4,953,619 A * | 9/1990 | Dullien et al. | .......... | 166/265 |
| 5,148,869 A * | 9/1992 | Sanchez | .......... | 166/303 |
| 5,273,111 A * | 12/1993 | Brannan et al. | .......... | 166/245 |
| 5,314,017 A | 5/1994 | Schechter et al. | .......... | 166/252 |
| 5,339,904 A * | 8/1994 | Jennings et al. | .......... | 166/303 |
| 5,503,226 A * | 4/1996 | Wadleigh | .......... | 166/252.1 |
| 5,711,373 A | 1/1998 | Lange | .......... | 166/252 |
| 5,899,274 A * | 5/1999 | Frauenfeld et al. | .......... | 166/401 |
| 6,089,322 A * | 7/2000 | Kelley et al. | .......... | 166/370 |
| 6,230,814 B1 * | 5/2001 | Nasr et al. | .......... | 166/400 |
| 6,263,965 B1 | 7/2001 | Schmidt et al. | .......... | 166/272.3 |

(Continued)

OTHER PUBLICATIONS

Development of Gas Assisted Gravity Drainage (GAGD) Process for Improved Light Oil Recovery, SPE 89357, Fourteenth Symposium on Improved Oil Recovery, Tulsa, OK, Apr. 17-21, 2004.

(Continued)

*Primary Examiner* — Angela M DiTrani
(74) *Attorney, Agent, or Firm* — John H. Runnels; Bonnie J. Davis

(57) ABSTRACT

A rapid and inexpensive process for increasing the amount of hydrocarbons (e.g., oil) produced and the rate of production from subterranean hydrocarbon-bearing reservoirs by displacing oil downwards within the oil reservoir and into an oil recovery apparatus is disclosed. The process is referred to as "gas-assisted gravity drainage" and comprises the steps of placing one or more horizontal producer wells near the bottom of a payzone (i.e., rock in which oil and gas are found in exploitable quantities) of a subterranean hydrocarbon-bearing reservoir and injecting a fluid displacer (e.g., $CO_2$) through one or more vertical wells or horizontal wells. Pre-existing vertical wells may be used to inject the fluid displacer into the reservoir. As the fluid displacer is injected into the top portion of the reservoir, it forms a gas zone, which displaces oil and water downward towards the horizontal producer well(s).

12 Claims, 29 Drawing Sheets

U.S. PATENT DOCUMENTS 6,318,464 B1 * 11/2001 Mokrys ............... 166/252.1
6,662,872 B2 * 12/2003 Gutek et al. ............... 166/272.4

OTHER PUBLICATIONS

Beecy, David, "Opportunities for Increasing Revenues from State and Federal Lanes: Pursuing the 'Standed Oil' Prize," presentation to Eastern Lands and Resources Council (Apr. 2005).

Chatzis et al., "On the Investigation of Gravity-Assisted Inert Gas Injection Using Micromodels, Long Berea Sandstone Cores, and Computer-Assisted Tomography," Paper SPE 18284, presented at the 63rd Annual Technical Conference and Exhibition of the Society of Petroleum Engineers held in Houston, TX, Oct. 2-5, 1988.

Christensen et al., "Review of WAG Field Experience", Paper SPE 39883, presented at SPE International Petroleum Conference and Exhibition, Villahermose, Mexico, Mar. 3-5, 1998.

Kulkarni, M. M., "Analytical Modeling of the Forced Gravity Drainage GAGD Process," Am.Inst. Chem. Eng. 2006 Annual Meeting (2006).

Kulkarni, M.M. et al., "Characterization of Operative Mechanisms in Gravity Drainage Field Projects Through Dimensional Analysis," Paper No. 103230-MS, Soc. of Pet. Eng. (2006).

Kulkarni, M.M. et al., "Experimental Investigation of Miscible Secondary Gas Injection," Paper No. 95975-MS, Soc. of Pet. Eng. (2005).

Kulkarni, M.M. et al., "Experimental Investigation of Various Methods of Tertiary Gas Injection," Paper No. 90589-MS, Soc. of Pet. Eng. (2004).

Kulkarni, M.M., "Immiscible and Miscible Gas-Oil Displacements in Porous Media," M.S. Thesis, Louisiana State University (Baton Rouge, LA [Aug. 2003]).

Kulkarni, M.M., "Multiphase Mechanisms and Fluid Dynamics in Gas Injection Enhanced Oil Recovery Processes," Ph.D. Thesis, Louisiana State University (Baton Rouge, LA [Aug. 2005]).

Rao, D.N. et al., "Development and Optimization of Gas-Assisted Gravity Drainage (GAGD) Process for Improved Light Oil Recovery," report prepared for the U.S. Department of Energy (Jan. 2006).

* cited by examiner

GAS-ASSISTED GRAVITY DRAINAGE (GAGD) PROCESS FOR IMPROVED OIL RECOVERY

The benefit of the Apr. 8, 2005 filing date of provisional application Ser. No. 60/669,489 is claimed under 35 U.S.C. §119(e).

The development of this invention was partially funded by the Government under grant number DE-FC26-02NT15323 awarded by the United States Department of Energy. The Government has certain rights in this invention.

This invention pertains to a process for enhancing the production level of hydrocarbons from subterranean hydrocarbon-bearing reservoirs by displacing oil downwards within the oil reservoir and into an oil recovery apparatus (e.g., a horizontal producer well).

An oil reservoir consists of a subterranean formation with small, interconnected pore spaces filled with hydrocarbon liquid (e.g., light oil and heavy oil), gas, and water that usually exist at an elevated pressure. The hydrocarbon liquid phase at the reservoir temperature and pressure will hereafter be referred to as "oil." The hydrocarbon liquid phase includes conventional liquid crude oils and liquid crude oils containing dissolved gases such as methane, ethane, propane, butanes, carbon dioxide, nitrogen, and hydrogen sulfide. The volume fraction of each phase in the pore space is commonly referred to as the "saturation" of the fluid. See, generally, U.S. Pat. No. 5,711,373.

Oil is initially produced from subterranean formations by "primary" methods that utilize high fluid pressures within the formation to extract and draw oil to the surface. See, generally, U.S. Pat. No. 5,711,373.

A number of methods can improve primary recovery, for example, water flooding (considered a secondary recovery technique), water alternating gas (WAG), which is considered a tertiary recovery technique often implemented to recover high oil saturation levels usually remaining in formations after the primary and secondary production is complete. FIG. 1 schematically illustrates the theoretical recovery of oil using the WAG process, which involves injecting large volumes of water and natural gas or $CO_2$ into a reservoir to physically displace oil towards production wells in the vicinity. However, studies have shown that the actual fluid flow behavior in the reservoir is substantially different from that shown in FIG. 1 because of the natural tendency of the injected gas to override (i.e., to rise upwards due to its lower density) and the injected water to under-ride (i.e., to fall downwards due to its higher density). See FIG. 2. This results in poor sweep efficiency (i.e., the volume fraction of the reservoir swept by the injected fluid) and low oil recovery. A high oil saturation may also remain in the reservoir after a waterflood as a result of high oil-water interfacial tension, which leads to the trapping of approximately 65-75% of the original oil in pores due, in part, to capillary and adhesion forces induced and imposed by the interfacial tension between the oil and the free-gas that has evolved from the oil when the reservoir pressure is depleted below the bubble-point pressure (i.e., the pressure at which the dissolved gases begin to evolve) of the original crude oil. Also, the original oil is trapped due to the interaction of the crude oil with rock surfaces characterized by wettability, adhesion and spreading.

Christensen et al., "Review of WAG Field Experience", Paper SPE 39883, presented at SPE International Petroleum Conference and Exhibition, Villahermose, Mexico, Mar. 3-5, 1998 discloses a review of 59 water alternating gas field experiences conducted around the world, including 37 WAG floods in the U.S. In a majority of the 59 projects reviewed, the incremental oil recovery ranged between 5-10 %, with an average incremental recovery of 9.7 % for miscible WAG projects and 6.4 % for immiscible WAG projects.

Other more advanced methods for recovering OOIP are referred to as tertiary recovery. The most common tertiary recovery method for light and medium crude oil is miscible flooding, which involves injecting natural gas liquids (e.g., carbon dioxide, ethane, propane and butane) into special injection wells to reduce surface tension and oil viscosity levels to help release the OOIP from the reservoir rock.

In the last twelve years, miscible $CO_2$ projects have increased from 52 to 66. As a result, oil production has almost doubled from 95,000 barrels per day (BPD) to 187,400 BPD. While the production and number of $CO_2$ miscible projects have increased steadily over the last two decades, all other gas injection projects (e.g., $CO_2$ immiscible, $N_2$ and flue gas projects) have declined or become extinct. In the U.S., oil production from miscible hydrocarbon gas injection projects between 1990 and 2000 has steadily increased from 55,386 BPD to 124,500 BPD despite the decrease in the number of gas injection projects. However, this trend was reversed in 2002 when the production from hydrocarbon gas floods fell to 95,300 BPD, perhaps due to the increasing price of natural gas. The overall effect is that the share of production from gas injection enhanced oil recovery (EOR) in the US has almost doubled from 23% in 1990 to 44.5% in 2002.

Another tertiary recovery process used to produce heavy oil and in-situ bitumen is the steam-assisted gravity drainage process (SAGD). This process involves injecting, steam through two horizontal wells located one below the other within the payzone, (i.e., rock in which oil and gas are found in exploitable quantities), until the payzone is heated and fluid communication is established between the two wells. Additional steam is used to heat the payzone above the upper well. As the steam condenses into liquid water, latent heat is transferred to the surrounding reservoir rock and oil. Heated oil and water from the condensing steam drain downwards towards the lower horizontal well and are then produced. As the steam chamber grows, cold oil residing adjacent to the steam chamber is heated thereby; reducing its viscosity so that it begins to drain with the water. Except for the heat being transferred from the steam to the oil, there are little mass transfer interactions between the phases, nor are there any significant effects of mutual solubility of phases and/or miscibility between the injected and produced fluids that impact the recovery: of oil. Furthermore, the injected steam, although of a lower density initially which causes it to rise inside of the reservoir; eventually condenses after losing its latent heat, and begins to drain downwards to the producing well along with the oil. Also, upon stopping steam injection, the steam chamber will collapse and the oil drainage and production will cease. The initial saturations of heavy oil and bitumen in these reservoirs are not trapped by capillary forces, but are immobile due mainly to their high viscosity.

Another tertiary process for recovering oil is the gravity-assisted inert gas injection process. Chatzis et al., "On the Investigation of Gravity-Assisted Inert Gas Injection Using Micromodels, Long Berea Sandstone Cores, and Computer-Assisted Tomography," Paper SPE 18284, presented at the $63^{rd}$ Annual Technical Conference and Exhibition of the Society of Petroleum Engineers held in Houston, Tex., Oct. 2-5, 1988 discloses the results of a gravity drainage experimental study in both capillary tubes and a long Berea sandstone core. The formation of an oil bank in the Berea core during the process with capillary barrier was demonstrated by CT scanning. The researchers concluded that high (~40%) oil recoveries under gravity-assisted inert gas injection are only possible when oil spreads over water (positive spreading coefficient), and the reservoir is strongly water wet. The gravity drainage process has been successfully implemented in many field applications in the US, Canada and in other parts of the world. Table 1 is a summary of the gravity drainage field application results.

The gravity drainage process has been implemented in many field applications in the US, Canada and in other parts of the world. Table 1 is a summary of the gravity drainage field application results.

sand deposit, comprising the steps of establishing at least one substantially vertical production bore hole extending from the surface of the earth to at least the bottom of the subsurface formation; providing a plurality of bore holes extending downwardly from the surface of the earth through the tar sand formation to substantially the bottom thereof and then substantially horizontally at or near the bottom of the tar sand formation and converging radially inward to each bore hole; continuously injecting steam downwardly, through the perforated or slotted tubes whereby the steam discharges through the perforations or slots and into the tar sand formation to

TABLE 1

| Property | West Hackberry | Hawkins Dexter Sand | Weeks Island SRB - Pilot | Bay St. Elaine | Wizard Lake D3A | Westpem Nisku D | Wolf-camp Reef | Intisar D | Handil Main Zone |
|---|---|---|---|---|---|---|---|---|---|
| Reference | 37 | 38 | 39 | 40 | 41 | 42 | 43 | 44 | 45 |
| Starting Date | July 1996 | January 1975 | October 1978 | May 1982 | October 1983 | January 1981 | Mid-1983 | December 1969 | November 1995 |
| Approximate Size (Acres) | 90 | N/A | 90 | 0.4 (Pilot) | 3725 | 3220 | 1306 | 3325 | 2965 |
| State/Country | Louisiana/USA | Texas/USA | Louisiana/USA | Louisiana/USA | Alberta/Canada | Alberta/Canada | Texas/USA | Libya | Borneo |
| Rock Type | Sand-stone | Sand-stone | Sand-stone | Shly-sand | Dolomite | Carbonate | Limestone | Biomicrite/Dolo. | Sand-Stone |
| Porosity (%) | 27.6-23.9 | 27 | 26 | 32.9 | 10.94 | 12 | 8.5 | 22 | 25 |
| Permeability (mD) | 300-1000 | 3400 | 1200 | 1480 | 1375 | 1050 | 110 | 200 | 10-2000 |
| Connate Water Sat. (%) | 19-23 | 13 | 10 | 15 | 5.64 | 11 | 20 | 16-38 | 22 |
| WF Residual Oil Sat. (%) | 26 | 35 | 22 | 20 | 35 | Sec. GF | 35 | 20-30 | 28 |
| GI Residual Oil Sat. (%) | 8 | 12 | 1.9 | N/A | 24.5 | 5 | 10 | N/A | N/A |
| Reservoir Temperature (° F.) | 205-195 | 168 | 225 | 164 | 167 | 218 | 151 | 226 | N/A |
| Bed Dip Angle (Degrees) | 23-35 | 8 | 26 | 36 | Reef | Reef | Reef | Reef | 5-12 |
| Pay Thickness (ft) | 31-30 | 230 | 186 | 35 | 648 | 292 | 824 | 950 | 50-82 |
| Oil API Gravity | 33 | 25 | 32.7 | 36 | 38 | 45 | 43.5 | 0 | 31-34 |
| Oil Viscosity (cP) | 0.9 | 3.7 | 0.45 | 0.667 | N/A | 0.19 | 0.43 | 0.46 | 0.6-1.0 |
| Bubble Pt Pressure (psi) | 3295 | 1985 | 6013 | N/A | 2154 | 3966 | 1375 | 2224 | 2800-3200 |
| GOR (SCF/STB) | 500 | 900 | 1386 | 584 | 567 | 1800 | 450 | 509 | 2000 |
| Oil FVF at Bubble Pt | 1.285 | 1.225 | 1.62 | 1.283 | 1.313 | 2.45 | 1.284 | 1.315 | 1.1-1.4 |
| Injection Gas | Air | $N_2$ | $CO_2$ | $CO_2$ | HC | HC | $CO_2$ | HC | HC |
| Reservoir Pressure at end of WF (psi) | 3484 | 1985 | 5000 | 3334 | 2370 | 4060 | 970 | 4100 | 1000 |
| Minimum Miscibility Pressure (psi) | — | — | N/A | 3334 | 2131 | 4640 | 1900 | 4257 | — |
| WF Recovery (% OOIP) | 60 | 60 | 60-70 | 76.5* | 62.9* | N/A | 56.3* | N/A | 58 |
| Gas Flood Rec.: (% OIP) | 90.0 | >80.0 | 60.0 | 85.0 | 95.5 | 84.0 | 74.8 | 67.5 | N/A |

*Based on Reported Saturations

The field reviews underscore the applicability of the gas gravity drainage process to several reservoir types and characteristics in both secondary and tertiary modes. Gravity drainage is seen to be 'best applicable' to low connate water saturation, thick, highly dipping or reef type, and light oil reservoirs with moderate to high vertical permeability and low re-pressurization requirements. High recovery factors in the range of 58-95% OOIP have been reported.

U.S. Pat. No. 6,263,965 describes a method for recovering normally immobile hydrocarbon oil from a subsurface tar sand deposit, comprising the steps of establishing at least one substantially vertical production bore hole extending from the surface of the earth to at least the bottom of the subsurface formation; providing a plurality of bore holes extending downwardly from the surface of the earth through the tar sand formation to substantially the bottom thereof and then substantially horizontally at or near the bottom of the tar sand formation and converging radially inward to each bore hole; continuously injecting steam downwardly, through the perforated or slotted tubes whereby the steam discharges through the perforations or slots and into the tar sand formation to reduce the viscosity of the normally immobile oil over an area extending substantially between the perforated tube and the top of the tar sand formation creating an expanding generally conical-shaped production chamber; and draining the less viscous oil and steam condensate thus obtained downwardly by gravity to the bottom of the production chamber and then through the horizontal tubes into the bottom of the vertical production bore hole for collection.

U.S. Pat. No. 5,314,017 describes a method for assisting the recovery of petroleum from vertically fractured formations, particularly of the Spraberry type, comprising the steps of injecting $CO_2$ gas into the formation at a pressure approaching the miscibility pressure of the $CO_2$ and the petroleum in order to lower the interfacial tension between the $CO_2$ and the petroleum; continuing to inject the $CO_2$ into and up the vertical fractures in the formation to dissolve $CO_2$ into the petroleum in order to lower the interfacial tension between the $CO_2$ and the petroleum to establish a gravity drainage zone of petroleum in the vertical fractures of the formation; and recovering the petroleum from the gravity drainage zones of the formation.

U.S. Pat. No. 4,589,486 describes a method for recovering hydrocarbons from an underground formation, comprising the steps of determining the critical concentrations of crude oil components to carbon dioxide to achieve first contact miscibility of a mixture of the crude oil components and the carbon dioxide with the underground hydrocarbons; injecting a premixed transition zone slug into the formation at a volume sufficient to form a transition zone between the hydrocarbons of the formation and subsequently injected carbon dioxide or another drive fluid. In one embodiment, the premixed transition zone slug comprises carbon dioxide and various crude oil components at specific critical concentrations, formation temperature; and a selected pressure, which is substantially lower than the pressure needed for first contact miscibility of carbon dioxide with the underground hydrocarbons.

U.S. Pat. No. 4,042,029 describes a process for increasing the amount of oil recovered from an extensively fractured reservoir, comprising the steps of treating the reservoir by injecting or producing fluid to form a substantially gas-filled gas layer which overlies a gas-filled layer and surrounds a multiplicity of relatively low permeability oil-containing matrix blocks; injecting fluid comprising $CO_2$, into the gas layer within the fracture network in an amount sufficient to provide a $CO_2$ partial pressure of at least about 30% of the total pressurein at least a lower portion of the gas layer; producing from within the liquid layer an oil-containing liquid that is substantially free of undissolved gas; and correlating the rates and locations of the injections and productions of fluid so that the interface between the gas and liquid layers is kept at selected depths within the network of fractures.

A need exists for a rapid and inexpensive process for increasing the amount of. hydrocarbons (e.g., oil) produced and the rate of production from subterranean hydrocarbon-bearing reservoirs by displacing oil downwards within the oil reservoir and into an oil recovery. apparatus.

I have discovered a rapid and inexpensive process for increasing the amount of hydrocarbons (e.g., oil) produced and the rate of production from subterranean hydrocarbon-bearing reservoirs by displacing oil downwards within the oil reservoir and into an oil recovery apparatus. Compared to other secondary or tertiary processes for recovering original oil in place (OOIP), the novel process eliminates problems associated with poor sweep and water-shielding, and increases oil relative permeability near the producing well, without having to compete with gas flow. For example, in reservoirs containing fractures, the process enhances production rates by using the fractures as infinite permeability conduits for draining oil to the horizontal producer well, which could either intersect the fractures or be in close proximity to the fractures. The process is referred to as "gas-assisted gravity drainage" and comprises the steps of placing one or more horizontal producer wells near the bottom of a payzone (i.e., rock in which oil and gas are found in: exploitable quantities) of a subterranean hydrocarbon-bearing reservoir and injecting a fluid displacer (e.g., $CO_2$) through one or more vertical or horizontal wells. (Pre-existing vertical or horizontal wells may be used to inject the fluid displacer into the reservoir.) In one embodiment, as the fluid displacer is injected into the top portion of the reservoir, it forms a gas zone, which displaces oil and water downward towards the horizontal producer well(s). (The novel GAGD process does not require the formation of a gas zone to displace oil from the reservoir, but in immiscible injections a separate gas zone may occur naturally because of the occurrence of immiscibility between the injected fluid displacer and oil in the reservoir.)

Unlike WAG, the GAGD process takes advantage of the natural segregation of injected gas from crude oil in the reservoir because of their density differences and is widely applicable to different reservoir types (e.g., fractured and unfractured sandstone reservoirs, carbonate limestone and dolomite reservoirs) in both secondary modes (i.e., reservoirs with no water flood history) and tertiary modes (i.e., reservoirs with a water flood history).; In a preferred embodiment, $CO_2$ is injected into the reservoir at a position above the horizontal producer anywhere from the top of the payzone to a position in close vicinity to the horizontal producer well(s).

Figure 1:
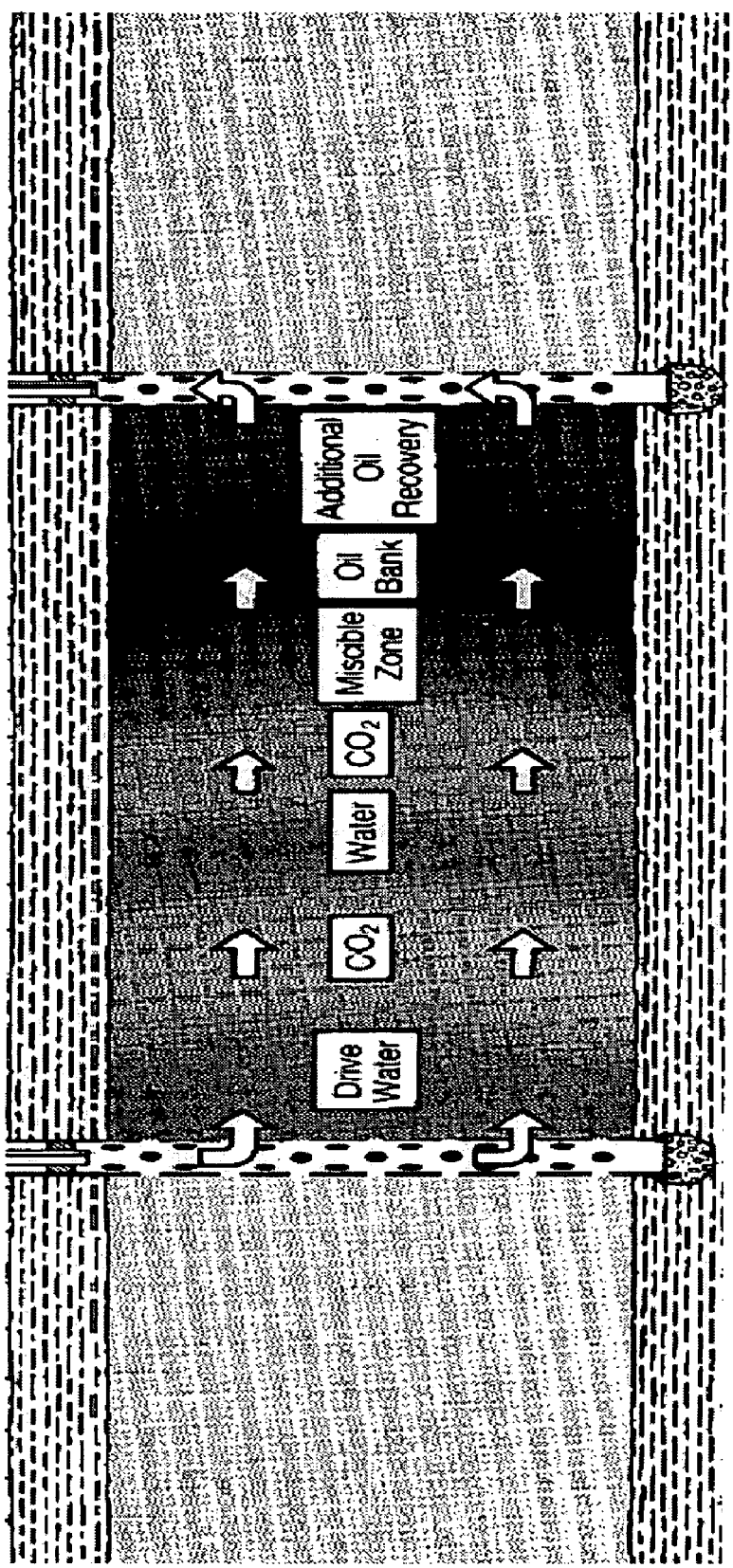
FIG. 1 is a schematic diagram of the theoretical recovery of oil using the water alternating gas (WAG) process.
Figure 2:
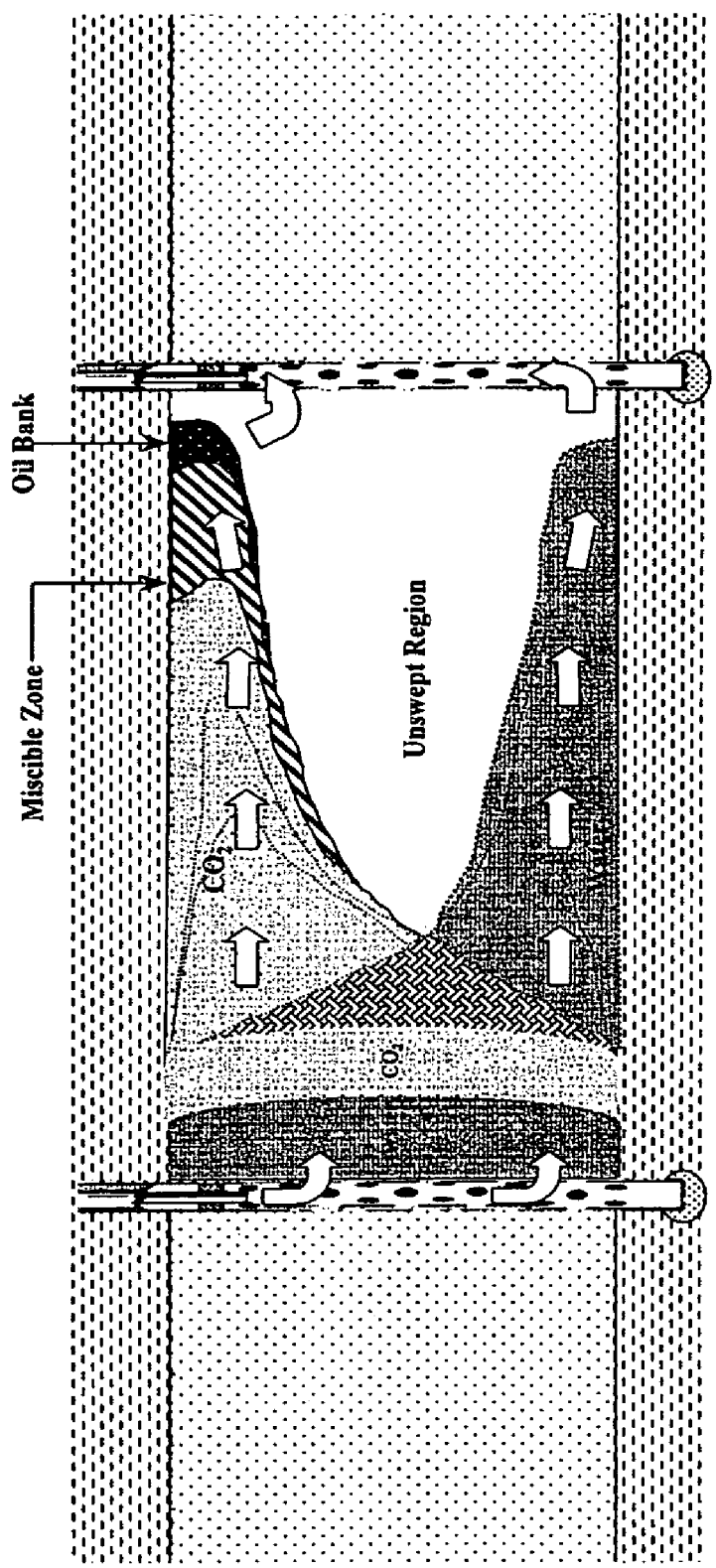
FIG. 2 is a schematic diagram depicting the probable failure mechanism of the WAG cycle shown in FIG. 1.

The general purpose of this invention is to provide an inexpensive process for the recovery of hydrocarbons from subterranean hydrocarbon-bearing reservoirs. More specifically, the purpose of this invention is to provide an inexpensive method for increasing the amount of hydrocarbons (e.g., oil) produced and the rate of production from subterranean hydrocarbon-bearing reservoirs by displacing oil downwards within the oil reservoir and into an oil recovery apparatus. To induce the downwards displacement of oil in the reservoir, the method comprises placing one or more horizontal producer wells near the bottom of the payzone (i.e., rock in which oil and gas are found in exploitable quantities) of a subterranean hydrocarbon-bearing reservoir and injecting a fluid displacer (e.g., $CO_2$) through one or more vertical or horizontal wells., (Pre-existing vertical wells may be used to inject the fluid displacer into the reservoir. Otherwise, one or more new vertical wells will have to be completed in the subterranean hydrocarbon-bearing reservoir.) As the fluid displacer is injected into the top portion of the reservoir, it forms a gas zone, which displaces oil and water downward towards the horizontal producer well(s). In a preferred embodiment, $CO_2$ is injected into the reservoir at a position above the horizontal producer well(s) anywhere from the top of the payzone to a position in close vicinity to the horizontal producer well(s). Higher molecular weight hydrocarbons such as ethane, propane, butane, pentanes (e.g., normal pentane and iso-pentane), and hexanes (e.g., normal hexane and iso-hexane) may be added to the fluid displacer (e.g., $CO_2$) to enable the gas mixture to become miscible with the oil in the reservoir at existing pressure and temperature conditions.

The GAGD process achieves low residual oil saturation in the gas zone, low gas-oil interfacial tension, or miscibility by maintaining the reservoir pressure near the minimum miscibility pressure (MMP) through control of the flow rates of injected gas and produced liquids. This requires quality data on MMP and MMC (minimum miscibility composition, as more fully explained below), and gas-oil compositional effects on gas-oil, gas-brine and oil-brine interfacial tensions at operating pressures and temperatures. The measurement of these three interfacial tensions also allows for the determination of the spreading coefficient of oil, which controls not only the nature of distribution of the three phases in the pore space, but also the oil drainage rates through film-flow.

There are several advantages to using this process to recover oil from reservoirs. First, the process yields higher incremental oil recoveries when compared to conventional gas injection processes such as water-alternating-gas. Second, the process allows for a reduction is gas compression costs by using relatively low pressure (near the MMP) applications in both immiscible and multi-contact miscible modes of operation. Third, the amount of gas required for the process is 2-3 MCF/Bbl, which is substantially lower than the 6-12 MCF/Bbl required in conventional water alternating gas process. Fourth, the process allows for the use of existing wells in depleted reservoirs as gas injectors, which eliminates the costs associated with drilling new injection wells. Fifth, the novel process allows for high oil production flow rates by using horizontal producers to withdraw the oil. Sixth, premature gas breakthroughs may be avoided or controlled using the novel process, unlike the conventional water alternating gas process, which usually results in premature end of the flood when the gas breaks through the vertical producing wells. Seventh, the novel process allows a-priori prediction of "field-scale" performance though reservoir simulations. Eighth, the novel process increases oil recovery rates in reservoirs containing highly permeable fractures, unlike conventional gas injection processes, which result in premature gas breakthroughs, poor sweep efficiencies and poor oil recoveries. Ninth, in fluvial and marine stratigraphic traps, wherein reservoir dips are substantial and the placement of horizontal wells is difficult, the novel process allows for selective drainage of structurally higher reservoir areas using horizontal wells, and for the conversion of 'gassed-out' horizontal producers, which occurs when the injected gas break through the producing horizontal well, into injectors. This helps drain the entire reservoir without requiring costly work-overs, infill drilling, and high cost slim (horizontal) holes in the remaining unswept areas of the reservoir. Tenth, the novel process may be used to recover oil in secondary and tertiary modes of operation in watered out and abandoned oil reservoirs. In tertiary mode, the mobile water production may be minimized by placing the horizontal well just above the oil-water contact level. Eleventh, the novel process enables enrichment of the injected original gas (due to mass transfer of hydrocarbon components from the crude oil) which can then be produced, treated, recompressed and injected either back into the same petroleum reservoir to perform a miscible or immiscible drainage process to further reduce the amount of trapped oil and to increase production, or can be reused to produce oil using in the novel process in another crude oil reservoir.

EXAMPLE 1

The Concept and Benefits of GAGD

Figure 3A:
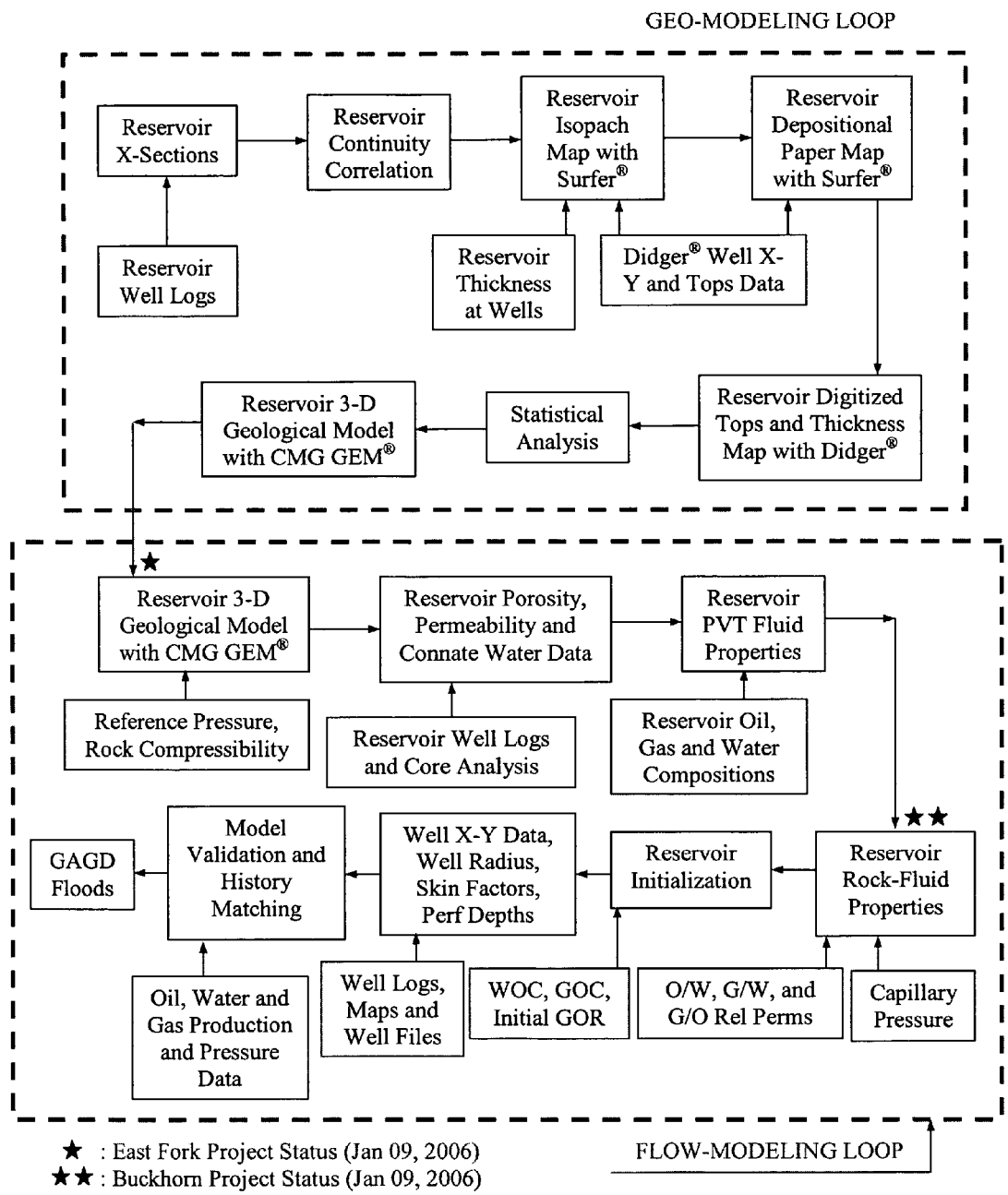
FIG. 3A is a schematic block diagram of one embodiment of the evaluation process for potential performance of the novel gas-assisted gravity drainage GAGD process.
Figure 3B:
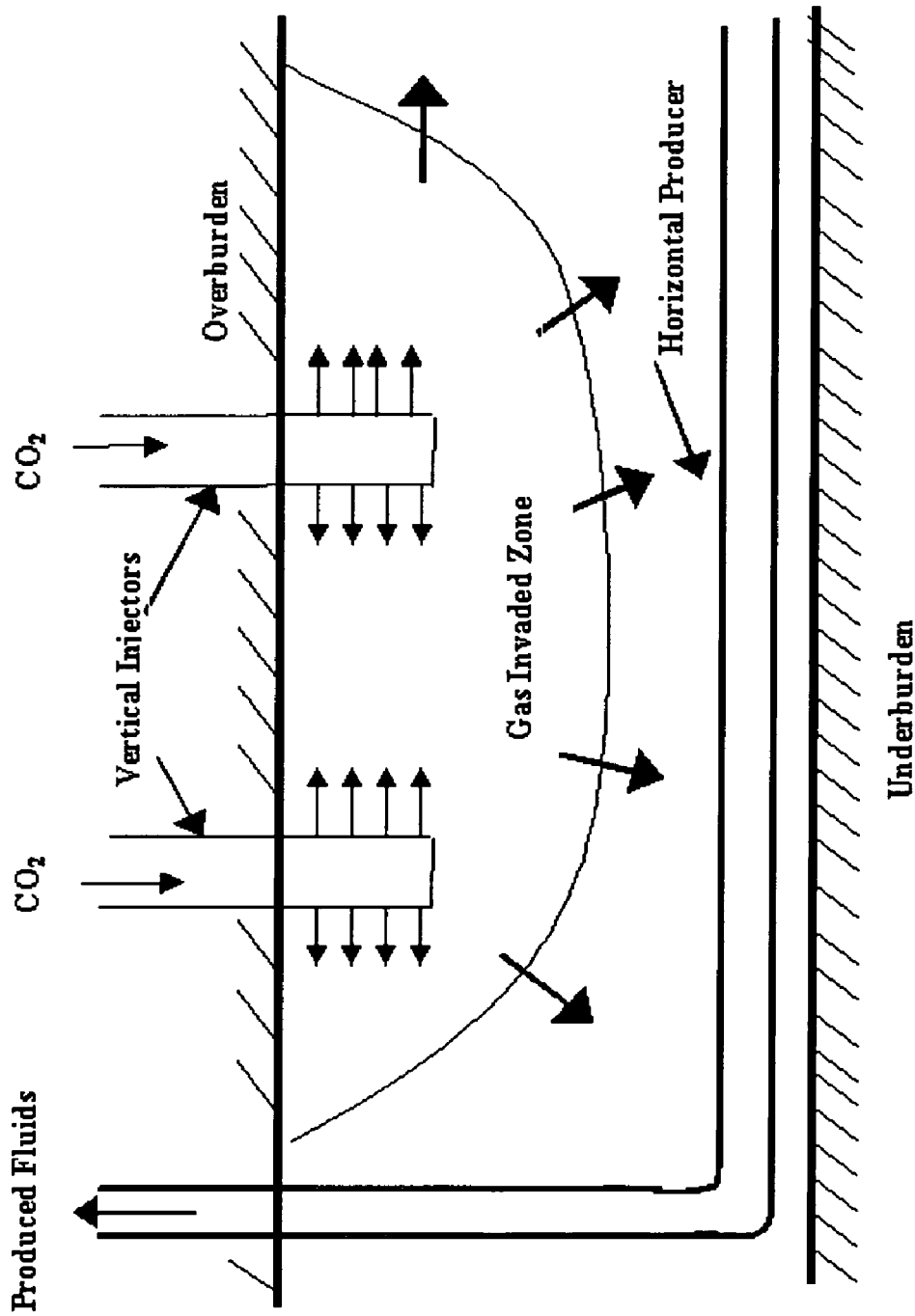
FIG. 3B is a schematic diagram of one embodiment of the GAGD enhanced oil recovery (EOR) process.

FIG. 3A shows a schematic block diagram of the evaluation process for potential performance of the GAGD process. The two main components for implementation of the GAGD process are reservoir characterization and reservoir flow simulation. The reservoir characterization requires reservoir thickness and top structural maps to define the reservoir boundaries and well logs, core analysis to determine the reservoir pore volume (porosity) and permeability. The reservoir flow simulation utilizes the data on fluids phase behavior, rock-fluids flow characteristics and the history match on reservoir pressure and fluids production data to predict the field-scale GAGD performance. By making use of these steps, one can evaluate the potential applicability and the performance of the GAGD process for any specific reservoir. FIG. 3B shows a schematic diagram of one embodiment of the gas-assisted gravity drainage process for the recovery of oil. In this embodiment, the process is practiced in a reservoir containing a horizontal and two vertical wells suitable for gas injection, core and fluid collection after integration of the reservoir characterization, laboratory experimental data and improved recovery simulation studies have been completed. (Existing vertical and horizontal wells may be used to practice the GAGD process. However, if the vertical and horizontal wells are not present, then one or more vertical wells and one or more horizontal wells must be drilled and completed before the process can be implemented.) A fluid displacer such as $CO_2$ is injected through one or more vertical wells, into a subterranean hydrocarbon-bearing reservoir such that the $CO_2$ accumulates at the top of the payzone of the reservoir due to gravity segregation. Other fluid displacers capable of displacing oil, such as natural gas and its components (e.g., methane, ethane, propane, nitrogen, etc.) also may be used. The novel process may also be carried out using one or more horizontal wells placed above the horizontal producer wells. As the $CO_2$ accumulates, oil is displaced downwards towards one or more horizontal producer wells located near the bottom of the reservoir, above the oil-water contact level. Next, the downwardly displaced oil is drawn through the horizontal wells and evacuated to the surface. To effectively displace oil within the reservoir, $CO_2$ is continuously injected to induce downward and sideway oil sweeping effects throughout the reservoir without increasing water saturation in the reservoir, because water injection is not required in the GAGD process to enhance the sweep efficiency. The gravity-stable gas injection practiced in GAGD maximizes the volumetric sweep efficiency. The gravity segregation of $CO_2$ also helps in delaying and/or eliminating $CO_2$ breakthrough (i.e., injected gas reaching the producer) to the horizontal producer(s), and thus preventing the injected gas from competing for flow with oil because the gas rises upwards while the oil drains downwards In a preferred embodiment, to maximize the oil displacement efficiency, the $CO_2$ pressure level should be maintained slightly above the minimum miscibility pressure (MMP) because considerably more oil is recovered when the gas is miscible in the oil than when it is immiscible.

Miscibility helps achieve low interfacial tension between the oil and the injected $CO_2$, which in turn results in large capillary numbers and low residual oil saturations in the $CO_2$ swept region. If the formation is water-wet, water is likely to be held back in the rock pores by capillary pressure, while oil will be preferentially displaced by the $CO_2$. If the formation is oil-wet, continuous films of oil will help to create drainage paths for the oil to flow to the horizontal producer well(s).

EXAMPLE 2

Preliminary Experiments with an Unscaled Model on Gravity Drainage

Development of a Scaled Physical Model to Test the Novel GAGD Process

To examine the effects of GAGD on the enhancement of oil recovery from subterranean hydrocarbon-bearing reservoirs, a physical model was constructed. (A scaled physical model also helps identify suitable reservoirs, optimum operating parameters, and to examine the effect of factors such as miscible/immiscible floods, wettability, and heterogeneity on the GAGD process.) Because the GAGD concept is new, use of a dimensional similarity approach enhanced the usefulness of data obtained from laboratory physical model experiments. In accordance with the dimensional similarity approach, a set of dimensionless groups was identified to represent similarity of the laboratory scaled model with an actual subterranean hydrocarbon-bearing reservoir. Two general methods for obtaining dimensionless groups used in scaling are dimensional analysis and inspectional analysis.

The general procedure of using inspectional analysis, as reported by M. Shook, et al., "Scaling Immiscible Flow Through Permeable Media by Inspectional Analysis," In Situ, vol. 16(4), pp. 311-349 (1992), was applied to the GAGD process in an immiscible gas injection process where the injected gas was immiscible in crude oil. The mechanisms operative in the GAGD process appeared to be reasonably well represented by the use of dimensionless parameters such as the Gravity (or Buoyancy) number, Capillary number, end-point mobility ratio, and an effective geometric aspect ratio to be matched between the field reservoir and the model.

For the miscible gas injection process, the following equalities were maintained, as indicated, by dimensional analysis and inspectional analysis:

$$\frac{\left(\frac{K\Delta\rho}{v\mu}\right)_P}{\left(\frac{K\Delta\rho}{v\mu}\right)_M} = \frac{\left(\frac{D_m}{vl}\right)_P}{\left(\frac{D_m}{vl}\right)_M} = \frac{\left(\frac{v\rho\sqrt{K}}{\mu}\right)_P}{\left(\frac{v\rho\sqrt{K}}{\mu}\right)_M} = \frac{\left(\frac{l}{\sqrt{K}}\right)_P}{\left(\frac{l}{\sqrt{K}}\right)_M} = \frac{\left(\frac{KP_c}{v\mu l}\right)_P}{\left(\frac{KP_c}{v\mu l}\right)_M} = 1$$

The ratio of all these terms for the prototype process to the model may be held constant by adjusting the rock and fluid properties (e.g., permeability, grain size, viscosity, and density) in the model. The first term in the above equation signifies the ratio of gravity forces to the viscous forces. The second term scales the molecular diffusion to the viscous forces (ratio of diffusion to convective dispersion). The third scaling ratio is for the Reynolds number. The fourth scaling ratio is that for the ratio of the total length of the system to the number of pores per unit length of the system. If this scaling ratio is maintained unity, then it is impossible to maintain the proper scaling of the gravity to viscous forces, and so the fourth term is neglected. The last scaling ratio is the capillary forces to the viscous forces. The scaling factors about which there are some uncertainties are those which affect the subsequent oil recovery after breakthrough and not the phenomenon occurring at the solvent water interfaces (e.g., frontal displacement, gravity override and viscous fingering). See S. Gharib, et al., "Physically Scaled Model Simulating the Displacement of Residual Oil by Miscible $_{CO2}$ in Linear Geometry," Paper SPE 8896, presented at the 50th California regional meeting of the Society of Petroleum Engineers of AIME held in Los Angeles, Calif., Apr. 9-11, 1980.

Construction of an Unscaled Physical Model

A physical model (not shown) comprising a porous media made of a bead pack was used for preliminary free gravity drainage studies to identify suitable reservoirs parameters, and to examine the effect of factors such as miscible/immiscible floods, wettability, and heterogeneity. The physical model was made of mainly two parallel pieces of transparent plastic plates and an aluminum frame. The inner dimensions of the model were 14.92 cm (length) by 35.23 cm (height) by 2.54 cm (depth) for a total volume of 1336 cc. Glass beads having a size ranging from 0.4 mm to 0.6 mm were used in the experiment. A porosity of 0.39 and an estimated permeability of 10 Darcy were achieved using dry-packing method that does not use a liquid to pack the beads tightly.

De-ionized water, n-decane, paraffin oil, and air having the physical properties shown in Table 2 were used in these experiments. A liquid pump and floating piston transfer vessel were used for saturation and desaturation of the porous media in the visual model with oil or water. Effluent liquids were collected in a glass cylinder. A CCD camera, frame grabber installed in a desktop personal computer and imaging analysis software (Labview software; National Instruments, Austin, Tex.) were used to measure oil and water production rates.

TABLE 2

| Fluids | Specific density | Dynamic viscosity (cP) | Interfacial tension (dynes/cm) |
|---|---|---|---|
| n-decane | 0.734 | 0.84 | $\sigma_{DW}$ = 49.0 |
| paraffin | 0.864 | 64.5 | Did not measure |
| De-ionized Water | 1 | 1.0 | $\sigma_{WA}$ = 72 |
| Air | 0.0012 | 0.0182 | $\sigma_{AD}$ = 51.4 |

EXAMPLE 3

Use of the Physical Model to Conduct Experiments with N-decane

At the start of every experimental run, the transfer vessel previously described was filled with n-decane. The chamber containing the water was first evacuated by connecting the decane side to a high-pressure nitrogen cylinder and using the pressurized gas to push down the piston and drive out the water. The decane side was then opened up, cleaned thoroughly using acetone, and filled with n-decane dyed red with the oil dye. After closing the transfer vessel securely, it was ready to be used in the experiments.

Preparing the Porous Medium

Each experimental run was conducted using a newly prepared porous medium (glass beads or sand pack). First, the physical model was assembled taking care to tighten the bolts using a torque wrench in numerical order (1 to 18). A torque of 60 lbs-in, at maximum, was put on the bolts to assure that a proper sealing of the model was achieved. The model was then filled with the appropriate porous medium (glass beads or silica sand) using the top ports and the help of a glass funnel. The filling method can be characterized as a pour-and-tap filling, meaning that the beads or sand grains were poured into the model under contiguous tapping to ensure a homogeneous and close packing of the glass beads or silica sand. To further ensure that the model was sealed, a vacuum was applied using a vacuum pump after filling and testing for leaks.

Initiating Gas Displacement Experiments

During gas displacement experiments, the produced liquids were carefully monitored and recorded using a LabView data acquisition system (National Instruments, Austin, Tex.). This was done through the use of a camera that recorded the fluid levels in the glass separator in which the produced liquids were collected.

Conducting the Secondary Displacement Experiments

The secondary mode displacement experiments were consistently conducted by first preparing the transfer vessel as previously explained. Next, the physical model was assembled and the porous medium packed in the model. Next, de-mineralized water was imbibed into the bead or sand pack using a burette. Once the model was completely saturated with water, the volume of imbibed water was recorded to calculate the bulk pore volume. Next, the de-mineralized water was displaced with n-decane using the transfer vessel and the centrifuigal pump at a constant rate of 3 cc/min, using a graduated glass cylinder to collect any effluent liquid during the water displacement. The centrifugal pump was shut off when no more water was produced and collected in the graduated cylinder. Next, the connate water saturation and the initial oil saturation was calculated using material balance equations. Next, the gas injection process was initiated and left running for a period of at least 24 hours to ensure thorough displacement and drainage of the fluids. Any produced fluids were collected in the glass separator and the fluid levels recorded using the LabView data acquisition system. Next, a pressurized gas cylinder and a gas pressure regulator with a pressure gauge were used to perform gas injection. Next, a pressurized gas cylinder and a gas pressure regulator with a pressure gauge were used to conduct constant pressure experiments. Next, a constant rat experiment was conducted by displacing gas using the gas mass rate controller along with the pressurized gas cylinder. Finally, oil recovery was calculated using mass balance equations. (When conducting fracture simulation experiments, all of the steps above apply, except that the fracture simulation is placed in the plastic frame prior to the assembly and filling of the physical model.)

Procedure for Conducting the Tertiary Displacement Experiments

The tertiary mode displacement experiments were very similar to the secondary mode experiments, except that a waterflood was performed before gas injection by first placing the physical model horizontal (non gravity-stable waterflood) and injecting water into it using the centrifugal pump at a rate of 3 cc/min. All produced liquids were collected in a graduated cylinder until no more oil was produced. Next, the residual oil saturation was calculated using mass balance equations. Next, the physical model was returned to a vertical position with the oil bank located at the top.

EXAMPLE 4

Gas-Oil Miscibility Evaluation

Solubility, Miscibility and Interfacial Tension

To evaluate fluid-fluid miscibility under reservoir conditions, slim-tube displacement tests were previously performed. Slim-tube displacement tests are presently considered as the industry standard for determining fluid-fluid miscibility conditions. However, evidence exists to question the validity of slim-tube displacement tests for miscibility determination. There is neither a standard design, nor a standard operating procedure, nor a standard set of criteria for determining the miscibility conditions within a slim-tube. Slim-tube lengths (5-120 ft), diameter (0.12-0.63 in), type of packing (glass beads and sand of 50-270 mesh), the permeability (2.5-250 Darcies) and porosity of the packing (32-45%) and the displacement velocity (30-650 ft/day) have varied greatly in the designs used to determine miscibility. Thus, a new VIT technique was used to determine the miscibility in $_{tetary}$ fluid systems. The standard $_{tertiary}$ liquid system of ethanol, water and benzene was chosen because their phase behavior and solubility data are readily available. See A. M. Elsharkawy, et al., "Measuring $CO_2$ Minimum Miscibility Pressure: Slim-Tube or Rising-Bubble Method?" *Energy & Fuels*, Vol. 10, pp. 443-449 (1996); Y. C. Chang, et al., "Qua$_{teriay}$ Liquid Systems with Two Immiscible Liquid Pairs," *Industrial Engineering Chemistry*, vol. 45, pp. 2350-2361 (1953); and N. V. Sidgwick, et al., "The System Benzene-Ethyl Alcohol-Water between +25° and −5°," *Journal of Chemical Society*, vol. 117, pp. 1397-1404 (1920).

The Vanishing Interfacial Tension (VIT) Technique for Gas-Oil Miscibility Determination From the tertiary phase diagram of the standard system of ethanol, water and benzene, it can be seen that the limiting tie line passing through the oil (benzene) intersects the solvent (aqueous ethanol) at an ethanol enrichment of 76%. Hence, this becomes the minimum miscibility ethanol enrichment for the system to attain miscibility. The solubility of benzene in aqueous ethanol at various ethanol enrichments is provided in Table 3, and plotted in FIG. 4, from which, the following important observations can be made.

TABLE 3

| Solubility (Sidgwick et al.) | | | Interfacial Tension | | |
|---|---|---|---|---|---|
| Solvent (mole %) | | Benzene Solubility | Solvent (mole %) | | Benzene IFT |
| Ethanol | Water | (gms/liter) | Ethanol | Water | (dynes/cm) |
| 34.8 | 65.2 | 134.3 | 0 | 100 | 32.94 |
| 46.6 | 53.4 | 343.2 | 10 | 90 | 12.52 |
| 53.3 | 46.7 | 629.1 | 20 | 80 | 4.88 |
| 61.2 | 38.8 | 1284.6 | 30 | 70 | 2.62 |
| 70.6 | 29.4 | 2351.6 | 40 | 60 | 1.17 |
| 78.0 | 22.0 | 5760.1 | — | — | — |

The solubility of benzene in aqueous ethanol begins at an ethanol enrichment of 35% and then gradually increases to become completely soluble at 78% ethanol enrichment, exhibiting an exponential relationship between solubility and enrichment. The solubility characteristics can be divided into three regions: (1) Region 1, exists at ethanol enrichments below 35%, where benzene is completely insoluble; (2) Region 2, exists at ethanol enrichments., between 35% and 78%, where benzene is partially soluble; and (3) Region 3, exists at ethanol enrichments above 78%, where benzene is soluble in all proportions, and is referred to. as the "miscible region." In Region 2, benzene is completely soluble below the solubility curve, and completely insoluble above the solubility curve. This region can be termed as partially soluble region. Therefore, the minimum miscibility ethanol enrichments for this standard $_{tertiary}$ fluid system by both the phase diagram (76%) and the solubility data (78%) appear to match closely.

Figure 4:
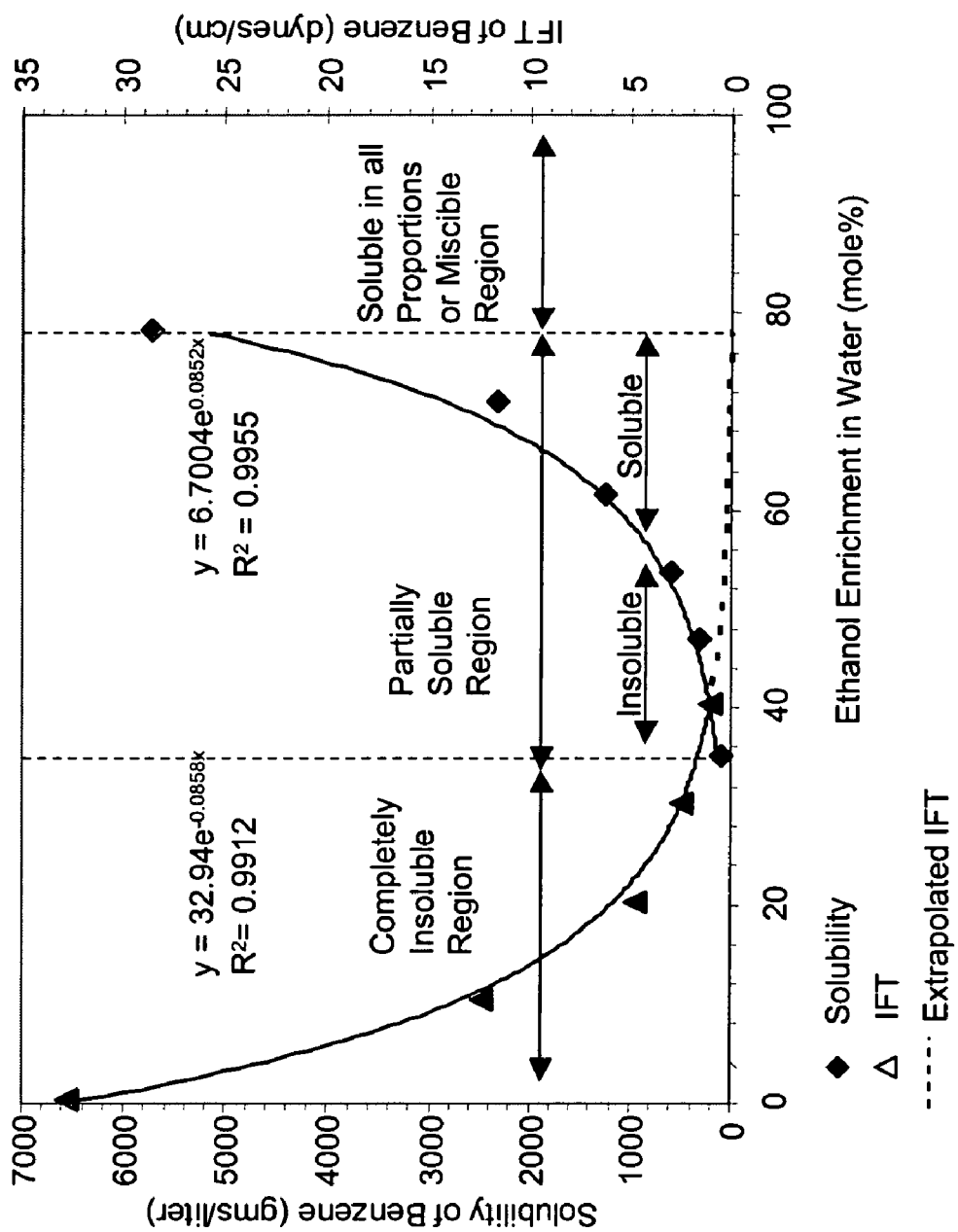
FIG. 4 is a graph plotting solubility of benzene and interfacial tension (IFT) of benzene as a function of ethanol enrichment in an aqueous phase.
Figure 5:
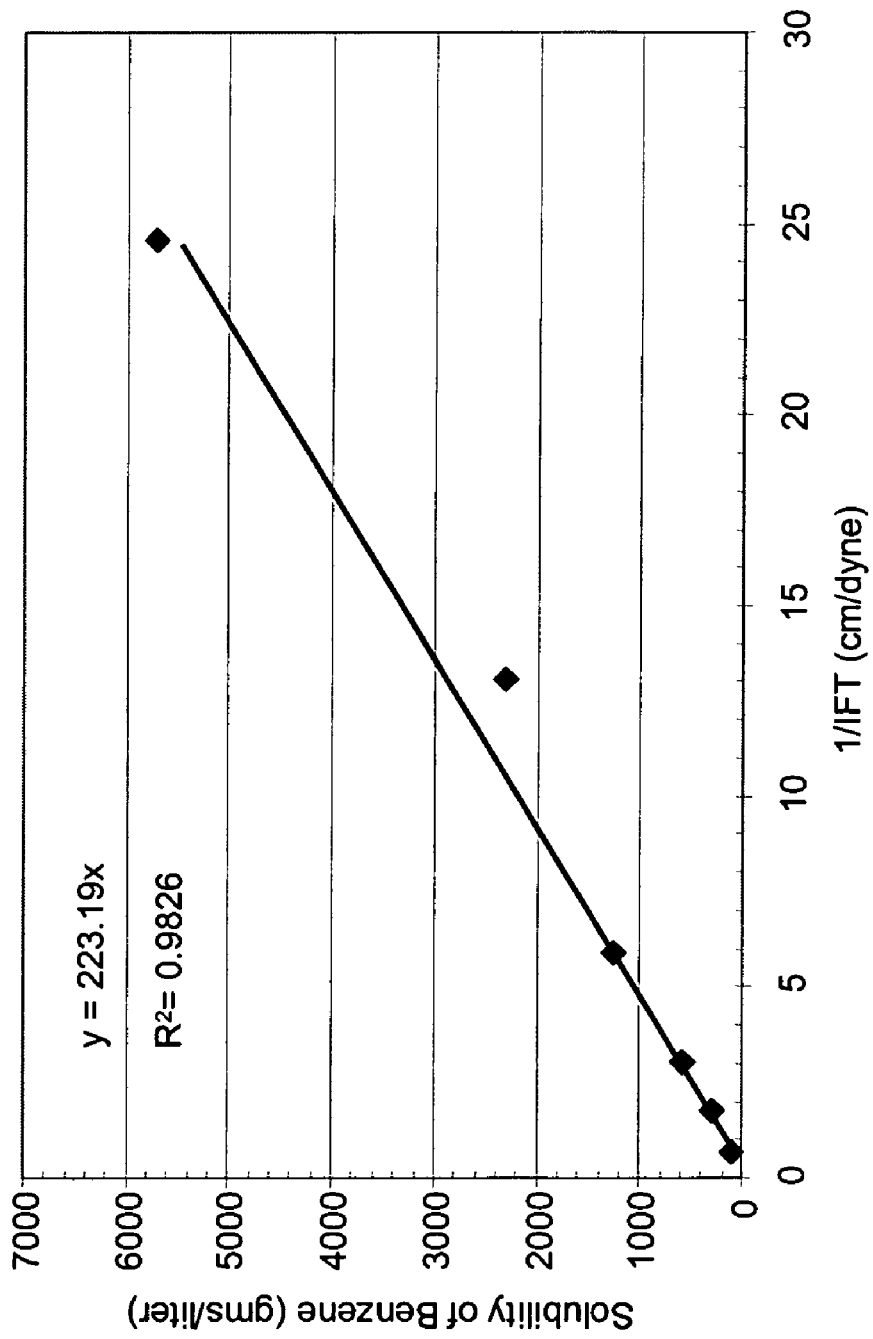
FIG. 5 is a graph plotting the solubility of benzene in an ethanol-water mixture as a function of reciprocal IFT.

The interfacial tension (IFT) between benzene and aqueous ethanol at various ethanol enrichments is measured in pendent drop mode, using the Axi-symmetric Drop Shape Analysis (ADSA) technique. The IFTs between the fluids could not be measured above 40% ethanol enrichment, using the drop shape analysis. At these ethanol enrichments, pendent drops could not be formed as the oil quickly escaped in streaks through the solvent, indicating proximity to miscible region. The measured values of interfacial tension for benzene in aqueous. ethanol at various ethanol enrichments are shown in Table 3 and summarized in FIG. 4. As shown in FIG. 4, IFT decreases exponentially as the ethanol enrichment in the aqueous phase increases. In order to determine the existence of a direct correlation between solubility and IFT, the solubility was plotted against reciprocal EFT, as shown in FIG. 5. Solubility was linearly related to (1/IFT), indicating a strong mutual relationship between these two thermodynamic properties.

From the correlation of miscibility and solubility with interfacial tension, it is evident that °FT must become zero at 78% ethanol enrichment, because benzene is not only soluble, but also soluble in all proportions (and hence miscible) at this percentage of ethanol enrichment. Further attempts are being made to use capillary rise technique for measuring low IFTs needed to clearly show the vanishing nature of IFT at 78% ethanol enrichment for benzene-water-ethanol $_{tertiary}$ liquid system (as indicated by the extrapolated IFT line in FIG. 4). Thus, the new VIT technique is able to determine the miscibility of $_{tertiary}$ liquid systems also.

Mass Transfer Effects on Interfacial Tension

While most of the thermodynamic properties refer to individual fluid phases, interfacial tension (°FT) is unique in the sense that it is a property of the interface between the fluid phases. Hence, it is strongly dependent on the composition of phases in contact, which in turn dependent on the mass transfer interactions between the phases. In order to study the mass transfer effects on IFT, the IFT measurements of VIT technique have been compared against D. B. Macleod and S. Sudgen's Parachor model predictions, using C. F. Weinaug, et al's molar averaging technique for multi-component hydrocarbon systems. In Parachor model, Parachor values of pure components are used, considering each component of the mixture as if all the others are absent. Due to this assumption, the counter-directional mass transfer mechanisms that affect the interfacial tension between the fluids are neglected in this model. Terra Nova reservoir fluids have been used since the phase behavior data for IFT computations and the IFT measurements are readily available. See D. B. Macleod, "On a Relation Between Surface Tension and Density," *Trans. Faraday Soc.*, Vol. 19, pp. 38-42 (1923); S. Sudgen, "The Variation of Surface Tension with Temperature and Some Related Functions," *Journal of Chemical Society*, pp. 32-41 (1924); and C. F. Weinaug, et al., "Surface Tensions of Methane-Propane Mixtures," *Industrial Engineering Chemistry*, Vol. 35, pp. 239-246 (1943).

The phase behavior data for the Terra Nova reservoir as described in S. C. Ayirala, et al., "Comparison of Minimum Miscibility Pressures Determined from Gas-Oil Interfacial Tension Measurements with Equation of State Calculations," Paper SPE 84187, presented;at the 2003 SPE Annual Technical Conference and Exhibition, October 5-8, Denver, Colorado, 2003, is used in EFT computations. IFT measurements, at various solvent enrichments as described in D. N. Rao, et al., "Application of the New Vanishing Interfacial Tension Technique to Evaluate Miscibility Conditions for the Terra Nova Offshore Project," *Journal of Petroleum Science and Engineering*, Vol. 35, pp. 247-262 (2002), are used for comparison with model predictions. A mixture consisting of 8 mole % of crude oil and 92 mole % of solvent is used as the feed composition in the calculations in order to match the composition used in the experiments.

Figure 6:
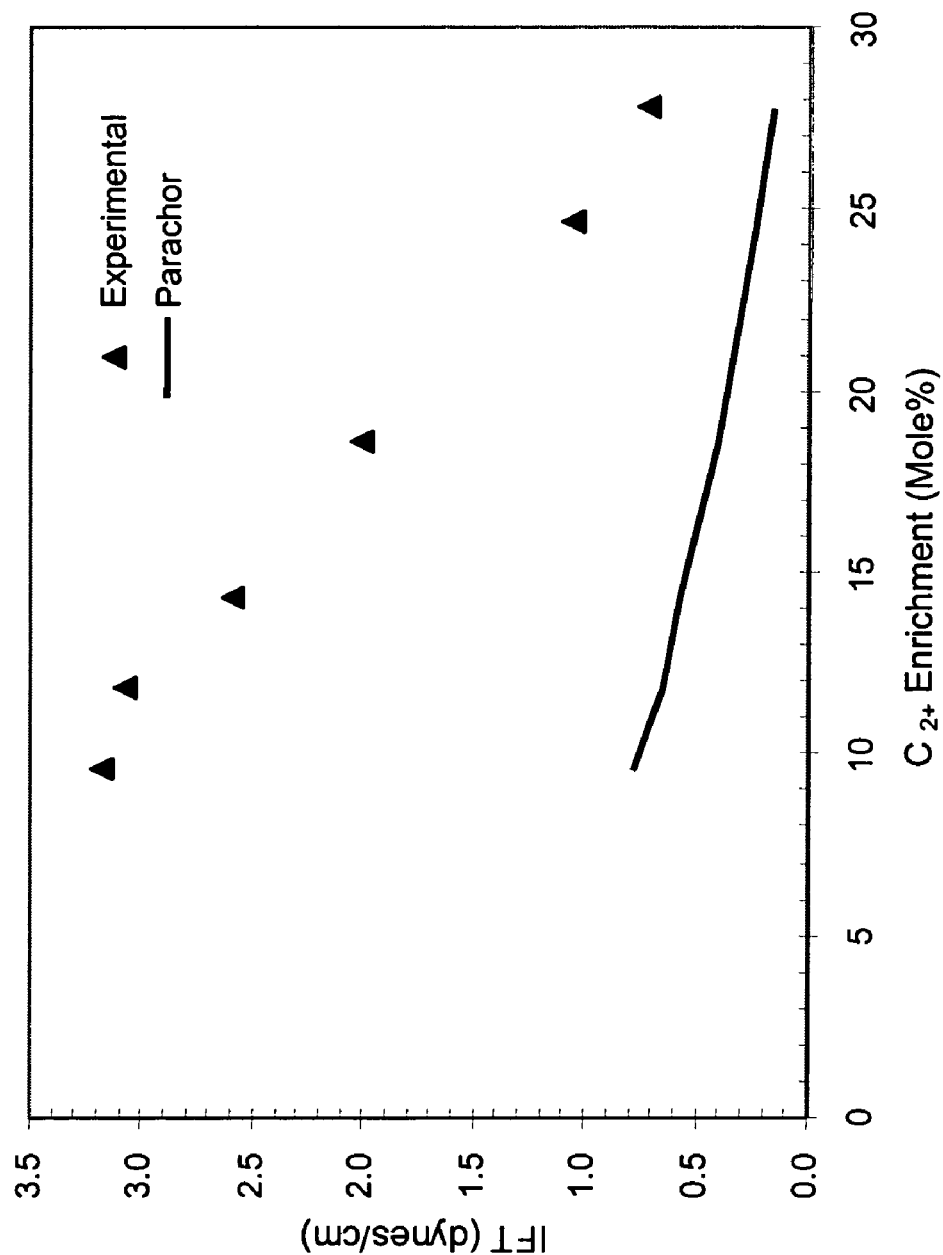
FIG. 6 is a graph plotting a comparing IFT measurements of the experimental and parachor model predictions as a function of $C_{2+}$ enrichment for Terra Nova fluids at 30 MPa and 96° C.

The comparison of experimental IFTs with Parachor model predictions for different $C_{2+}$ enrichments of solvent at 30 MPa and 96° C. is given in Table 4 and shown in FIG. 6. As can be seen, the match between the experiments and the model predictions is very poor and significant EFT under-predictions are obtained with the Parachor model. This is mainly attributed to the absence of mass transfer effects in the Parachor model. This not only points out the importance of mass transfer effects on IFT, but also the fact that the IFT measurements used in the VIT technique for Terra Nova miscibility evaluation include all the mass transfer effects in them.

TABLE 4

| Enrichment | IFT (dynes/cm) | |
| --- | --- | --- |
| ($C_{2+}$ %) | Experimental* | Parachor Model |
| 9.49 | 3.19 | 0.78 |
| 11.7 | 3.09 | 0.66 |
| 14.2 | 2.60 | 0.58 |
| 18.5 | 2.02 | 0.41 |
| 24.6 | 1.07 | |
| 27.7 | 0.73 | 0.15 |

*See D. N. Rao et al., (2002).

EXAMPLE 5

Experimental Evaluation of Gas Injection Modes at Elevated Pressures

Coreflood Laboratory Experiments

Coreflood laboratory experiments were conducted to evaluate the effects of (i) mode of gas injection, (ii) miscibility development and (iii) core length on gas-oil displacements on the GAGD process. Miscible floods at 2500 psi and immiscible floods at 500 psi were carried out, using 1-ft Berea cores, n-Decane and two different brines, including a 5% NaCl solution and multi-component reservoir brine from the Yates reservoir in West Texas. Each of the corefloods consisted of a series of steps, including brine saturation, absolute permeability determination, flooding with oil to initial oil saturation, end-point oil permeability determination, flooding with brine to residual oil saturation, end-point water permeability determination, and tertiary gas injection to recover the waterflood residual oil.

The Tertiary Recovery Factor (TRF) (i.e., the oil recovery per unit volume of gas injected) and conventional recovery plots were used as a common comparison parameter for the fair and consistent performance evaluation of the various tertiary gas injection mode corefloods.

Continuous Gas Injection Versus Water Alternating Gas

Figure 7A:
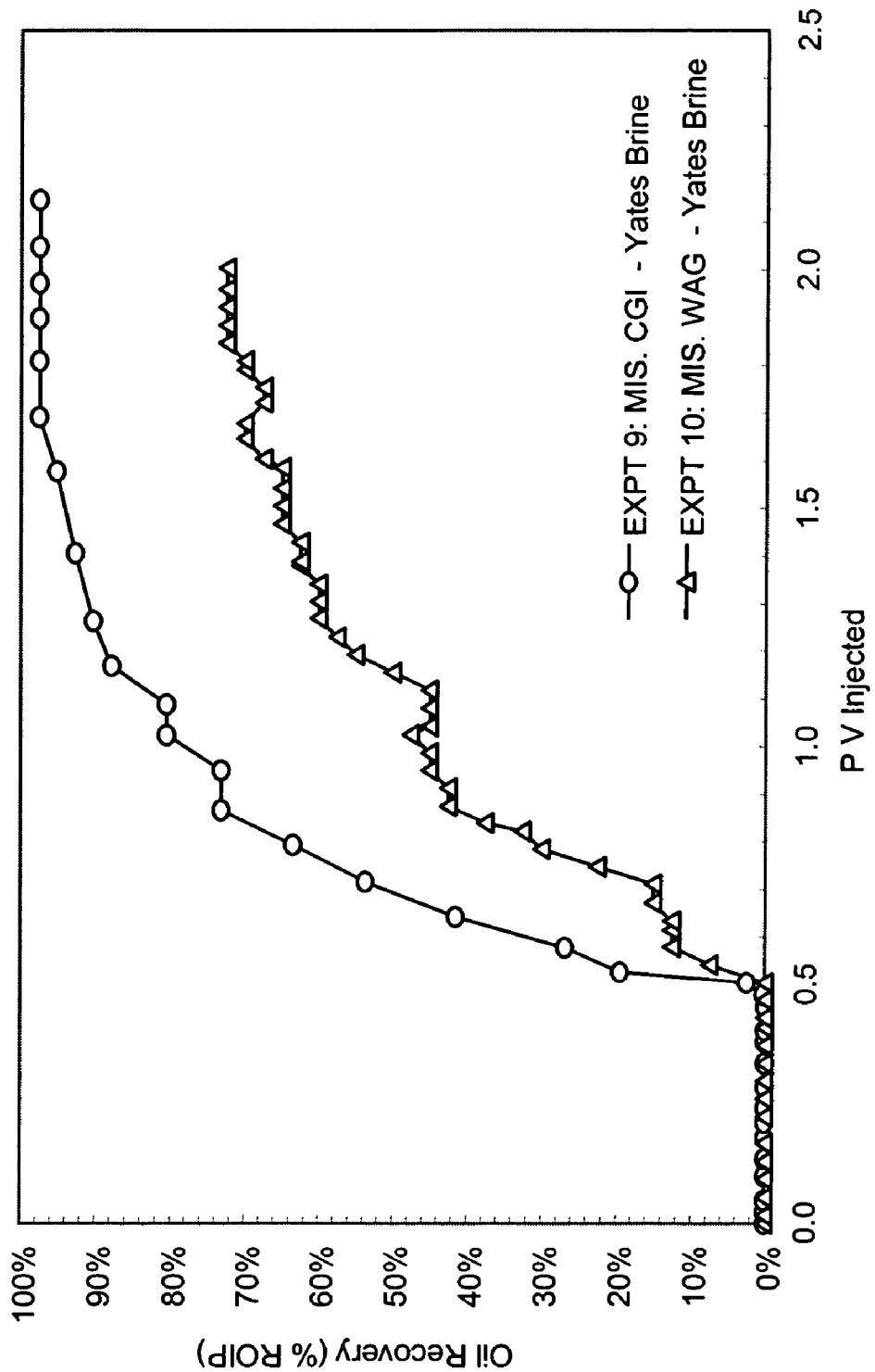
FIG. 7A is a graph comparing oil recovery of miscible continuous gas injection (CGI) and miscible WAG as a function pore volume (PV) fluid ($CO_2$ or water) injected.
Figure 7B:
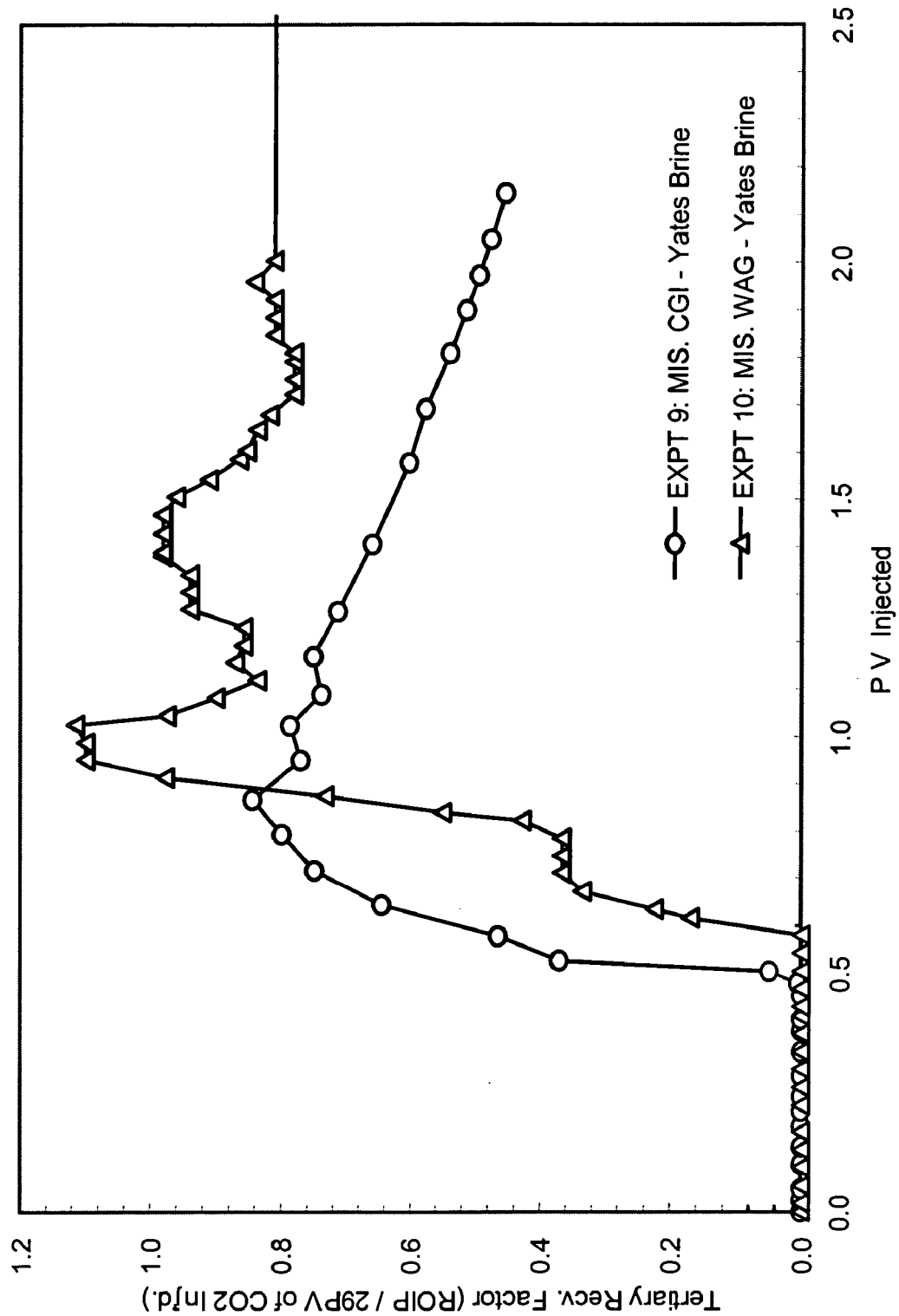
FIG. 7B is a graph comparing the tertiary recovery factor (TRF) of miscible CGI and miscible WAG as a function pore volume (PV) injected.

FIGS. 7A and 7B are graphs comparing the performance of continuous gas injection (CGI) and water alternating gas (WAG) for n-Decane and Yates reservoir brine in TRF and conventional recovery, respectively. FIG. 7A a graph plotting the percentage of oil recovery as a function of pore volume (PV) injected. The CGI flood, as shown in FIG. 7A, recovered a higher percentage of oil than the WAG flood. (These conclusions are somewhat misleading because the amount of $CO_2$ injected in WAG floods was only half the amount injected in the CGI floods.) FIG. 7B is graph plotting the percentage of oil recovery as a function of pore volume injected based on TRF, which shows that the TRF value for the CGI flood decreased substantially in later stages of the flood, while the WAG employment arrested this decline, yielding a relatively steady TRF value of about 0.9. However, the WAG floods had lower production rates than the CGI floods.

As shown in FIG. 7B, the WAG miscible floods demonstrated periodic increases corresponding to gas injection periods in the TRF throughout the life of the flood. By comparison, the TRF crested at ~0.7 PV injection and later declined with increasing gas injection in the CGI miscible floods. This demonstrates that the WAG process, due to better mobility control, had better $CO_2$ utilization efficiency than the CGI process. Similar TRF trends were also observed when 5% NaCl brine was used. These results indicated that optimum performance could be obtained by a combination of CGI and WAG modes of gas injection.

Figure 8A:
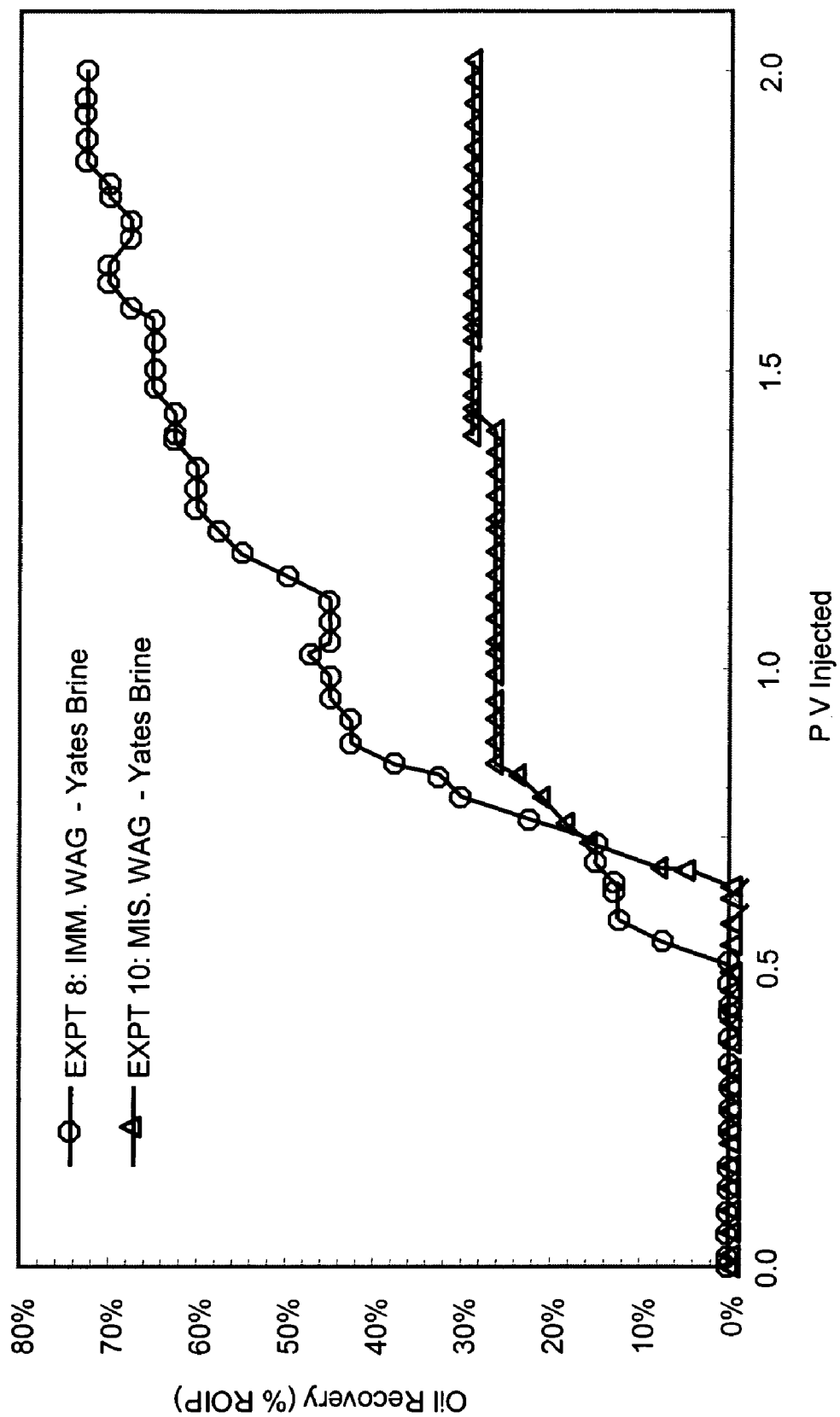
FIG. 8A is a graph comparing oil recovery of immiscible WAG and miscible WAG as a function pore volume (PV) injected.
Figure 8B:
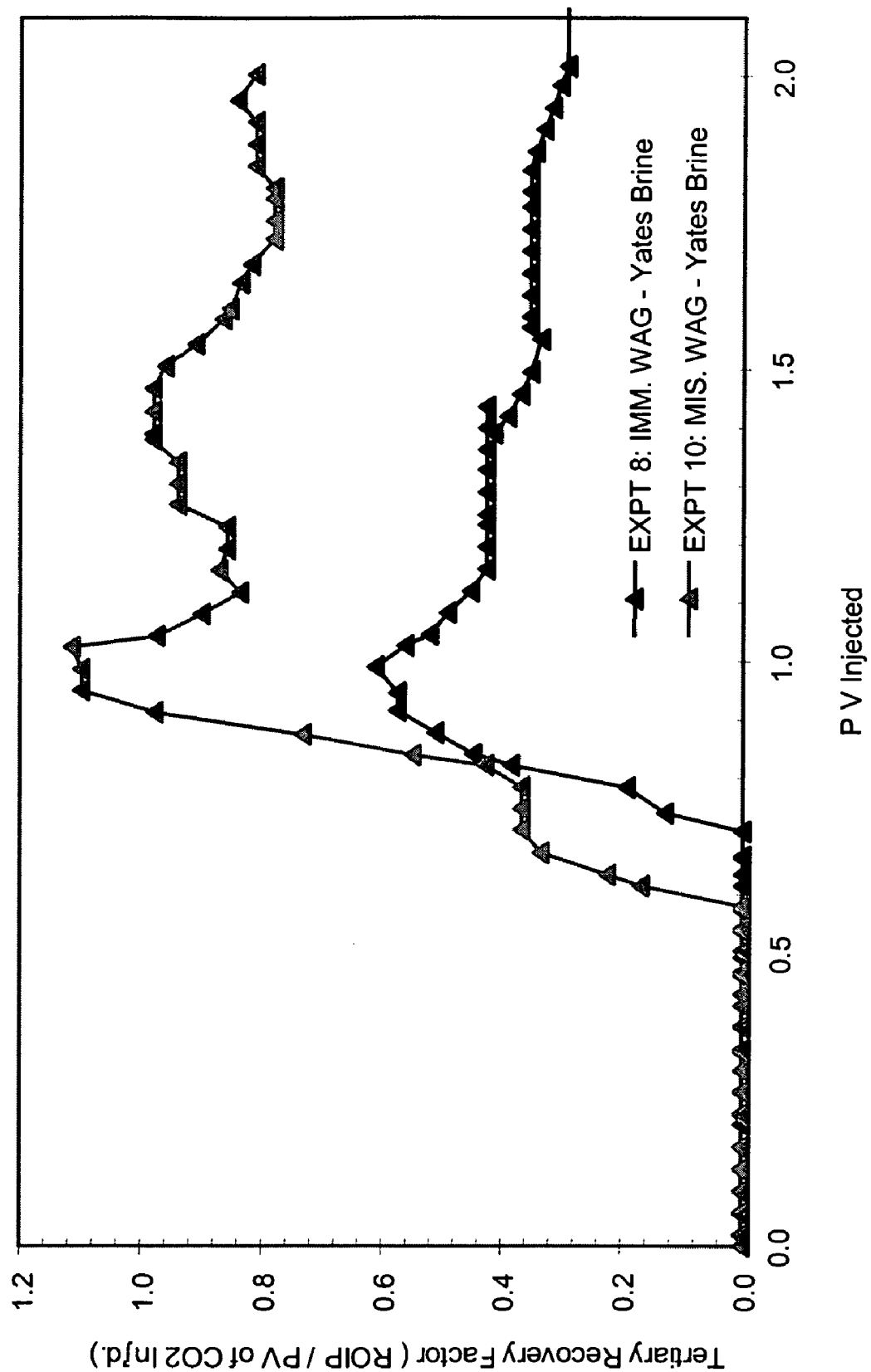
FIG. 8B is a graph comparing the TRF of immiscible WAG, and miscible WAG as a function pore volume (PV) injected.

Similar comparisons of immiscible and miscible WAG coreflood experiments showed the distinct advantage of miscibility development in floods. FIGS. 8A and 8B are graphs comparing the miscible and immiscible WAG flood performance for n-Decane and Yates reservoir brine systems in terms of conventional recovery and TRF, respectively. While the miscible WAG displacement recovered about 75% of OOIP as shown in FIG. 8A, the immiscible WAG recovered about 30% OOIP. The higher oil recoveries for miscible displacements were attributed to a large reduction in interfacial tension between the displacing and displaced fluids due to miscibility development resulting in very high capillary numbers and near perfect microscopic displacement efficiency.

Evaluation of Modes of Gas Injection in Long Cores

To evaluate the modes of gas injection in long cores, immiscible GAGD floods were conducted in a 6-ft Berea core using 5% NaCl brine and n-Decane. Floods with long cores were conducted with n-Decane and 5% NaCl brine prior to exposing the cores to crude oils. Immiscible CGI and WAG floods were conducted in similar conditions for comparison with GAGD floods. Results of these floods are shown in FIG. 9.

Figure 9:
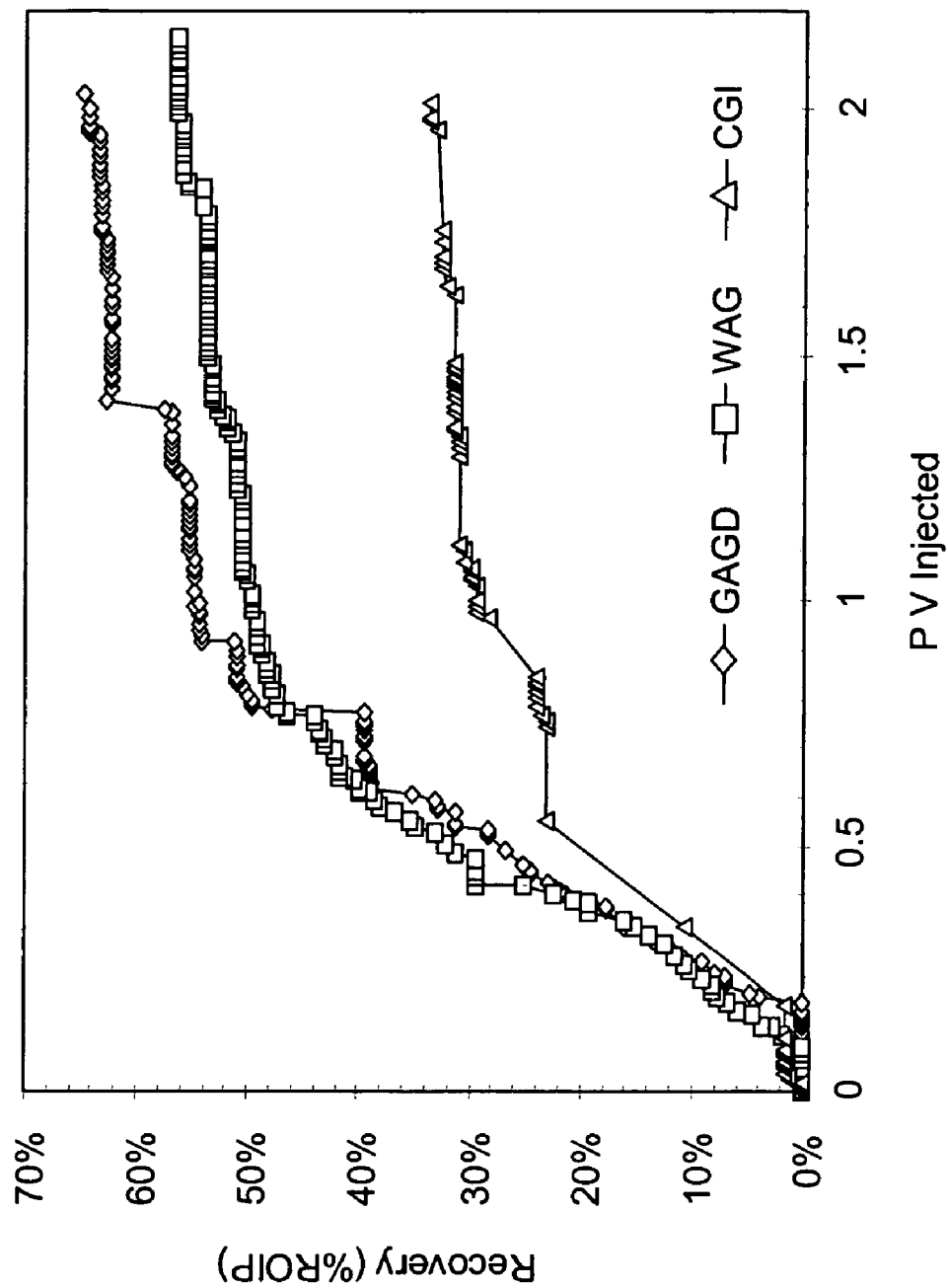
FIG. 9 is a graph plotting a comparison of oil recovery as a function of PV injected for GAGD, WAG, and CGI in 6-ft long Berea Cores.

FIG. 9 is a graph plotting a comparison of oil recovery as a function of PV injected for GAGD, WAG, and CGI. A substantial difference in oil recovery existed between the CGI and WAG process, which were not obvious in the 1-ft immiscible corefloods. This indicates that gravity segregation would be more pronounced in the longer cores. Thus, long core tests are essential for assessing the performance of floods involving gravity segregation effects. The GAGD process had the highest recovery efficiency compared to WAG and CGI. The GAGD process produced nearly 8.6% higher tertiary EOR oil than WAG, and 31.3% more tertiary EOR oil than CGI, even in the immiscible mode.

The short and long core floods have clearly demonstrated the high oil recovery potential of the GAGD process compared to that of WAG. As expected, miscible $CO_2$ floods have out performed the immiscible floods in all three modes of gas injection (CGI, WAG and GAGD).

EXAMPLE 6

Comparison of Conventional Gas Injection Processes With GAGD

To compare conventional gas injection processes (e.g., continuous gas injection (CGI), water alternating gas (WAG)

and hybrid-WAG) with the novel GAGD process, coreflooding experiments were conducted in miscible secondary mode (72° F. and 2500 psig) and in immiscible secondary mode (72° F. and 500 psig) using 1-ft long and 6-ft long Berea sandstone cores having a diameter of 2 in, respectively. The coreflood apparatus and experimental procedures used are well known in the art. N-decane (oil phase), Yates reservoir brine (water phase) and pure $CO_2$ (gas phase) fluids were used to conduct these experiments. The experimental results for 1-ft and 6-ft long Berea sandstone cores are summarized in FIGS. 10 and 9, respectively.

Figure 10:
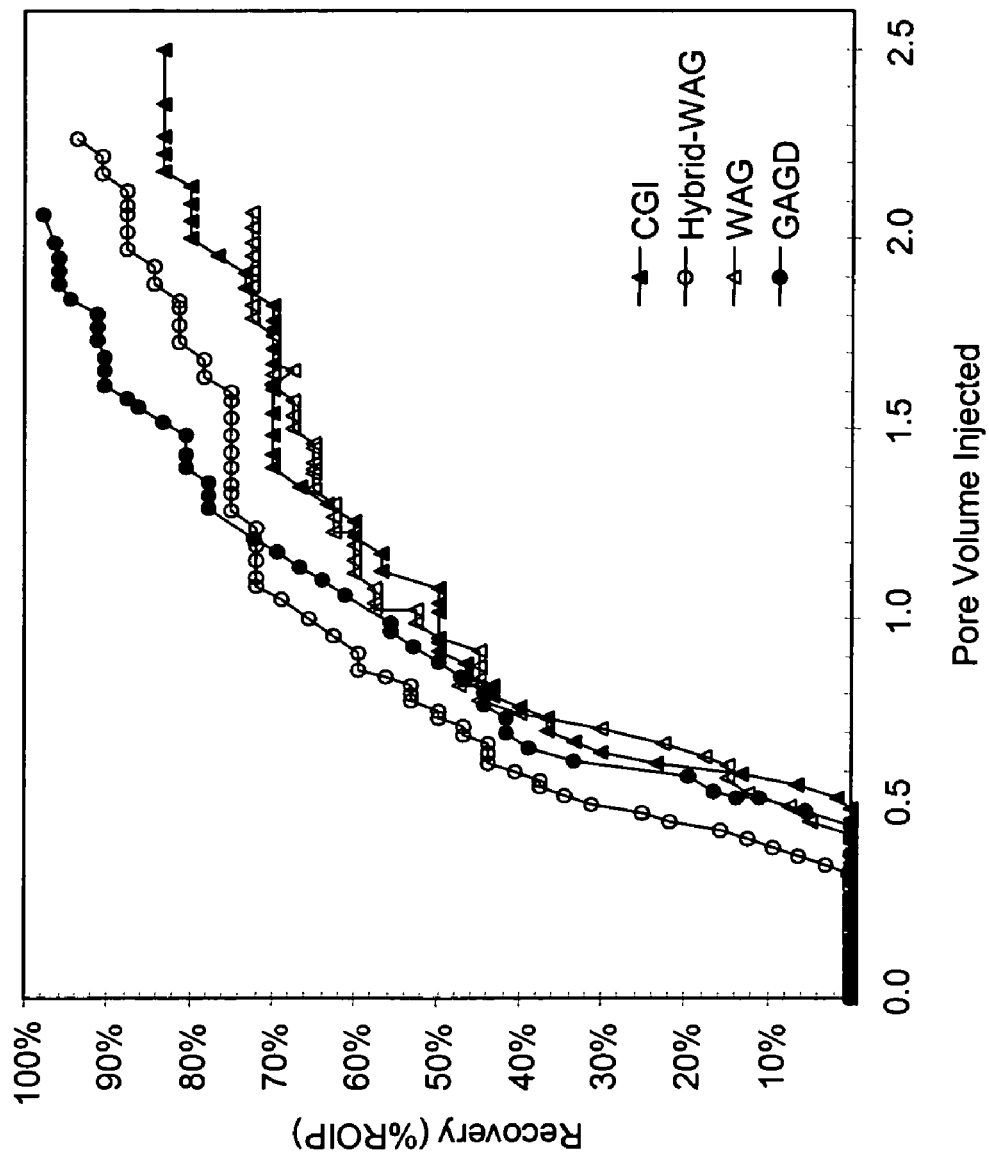
FIG. 10 is a graph plotting a comparison of oil recovery as a function of PV injected for GAGD, WAG, CGI, and hybrid-WAG in 1-ft long Berea Cores.

The GAGD process produced higher incremental oil recoveries in both 1-ft and 6-ft Berea sandstone cores, as shown in FIGS. 10 and 9, respectively. The GAGD process, as shown in FIG. 10, recovered approximately 98% of the residual oil in place (ROIP) in the miscible mode, while the WAG process recovery was 84%. The GAGD process, as shown in FIG. 9, recovered approximately 67% of the ROIP in the immiscible mode, while the WAG process recovery was 54%. The WAG process is known to yield oil recoveries of only 5-10% OOIP in the field, which may be attributed to the fact that the process works well only in near-the-injection well-bore regions. In regions a few feet away from the injection well bore, gas and water are known to follow their natural tendencies to rise and fall, respectively, resulting in large un-swept portions of the reservoir, and thereby leading to poor oil recoveries. Gravity segregation effects between the fluids are not appreciable in laboratory corefloods due to the limited size of the reservoir cores as indicated by the relatively good recovery performance of WAG floods in the above corefloods.

Figure 11:
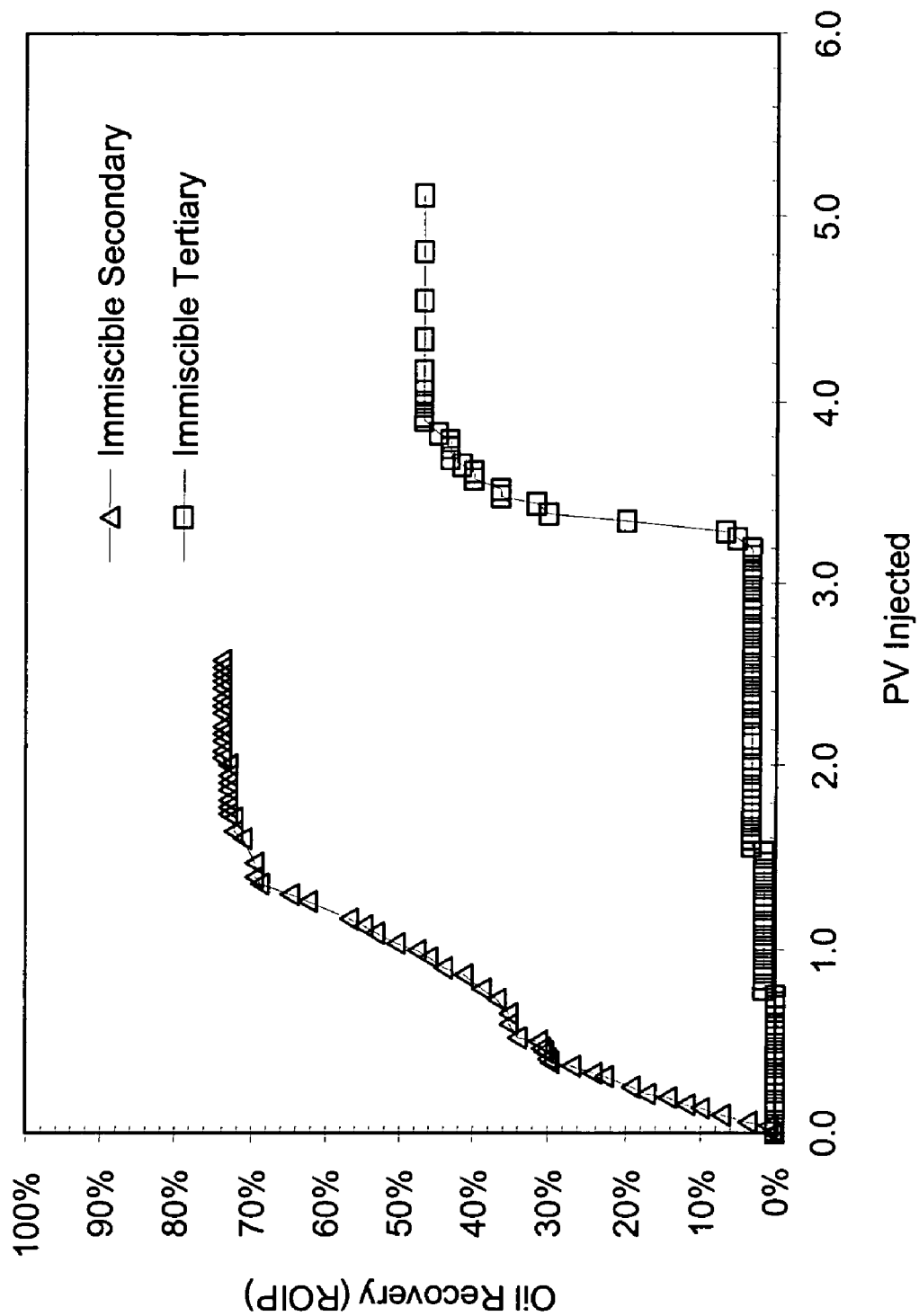
FIG. 11 is a graph comparing oil recovery of immiscible secondary and immiscible tertiary as a function pore volume (PV) injected.

FIG. 11 is a graph comparing the oil recovery as a function of injected pore volume of $CO_2$ for the GAGD process conducted in a 1-ft Berea Sandstone Core in immiscible tertiary and immiscible secondary conditions. N-decane, Yates Reservoir Brine, and $CO_2$ fluids were used to conduct the experiments. The GAGD process, as shown in FIG. 11, recovered approximately 75% of the ROIP in immiscible secondary conditions and 49% ROIP in immiscible tertiary conditions. FIG. 11 shows that the GAGD process can perform well even in the low pressure immiscible mode in both secondary and tertiary modes. It also points out that in waterflooded reservoirs, the initial production of oil from a GAGD process would be delayed until the mobile water is produced first. This delay can be mitigated by placing horizontal producer just above the oil-water contact.

Figure 12:
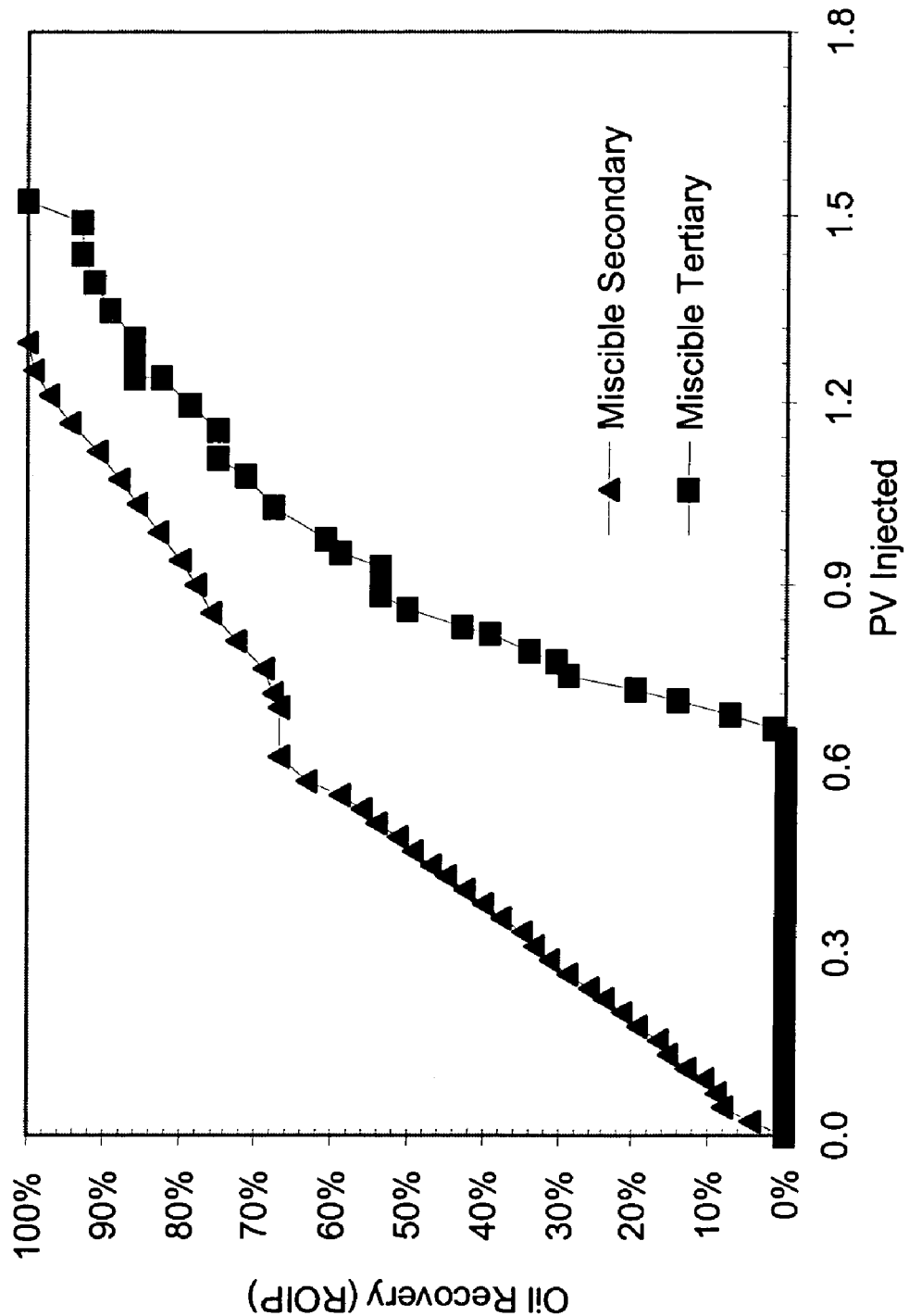
FIG. 12 is a graph comparing oil recovery of miscible secondary and miscible tertiary as a function pore volume (PV) injected.

FIG. 12 is a graph comparing the oil recovery as a function of injected pore volume of $CO_2$ for the GAGD process conducted in a 1-ft Berea Sandstone Core in miscible tertiary and miscible secondary conditions. N-decane, Yates Reservoir Brine, and $CO_2$ fluids were used to conduct the experiments. The GAGD process, as shown in FIG. 12, recovered 100% of the ROIP in both the miscible secondary and tertiary conditions. However, in the miscible secondary condition, the oil production started immediately upon gas injection whereas in the tertiary miscible flood, the presence of mobile water (injected previously during the waterflood) delayed the oil production until about 0.6 PV of $CO_2$ injected.

Figure 13:
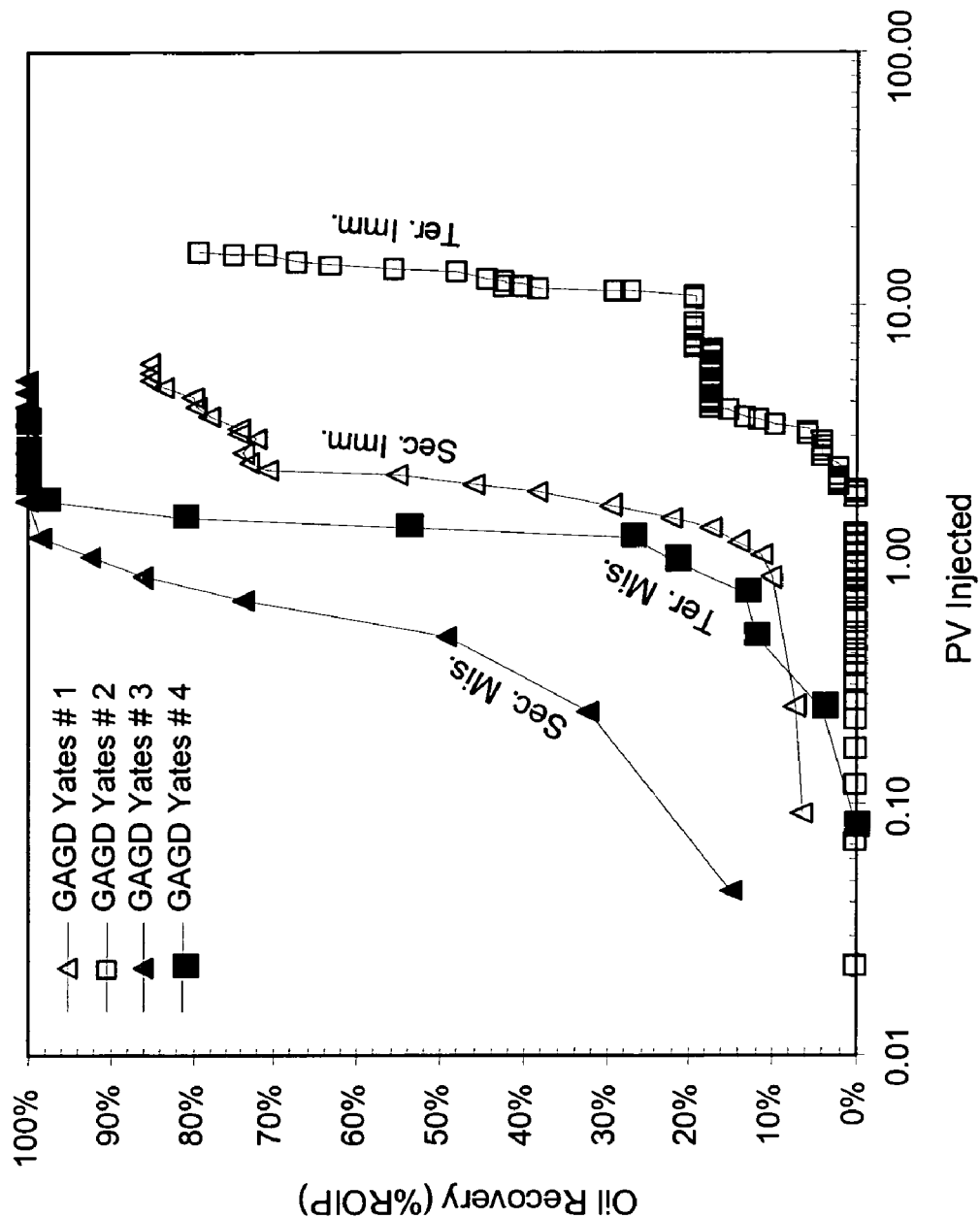
FIG. 13 is a graph comparing oil recovery of immiscible and miscible secondary, immiscible and miscible tertiary as a function pore volume (PV) injected using the GAGD process.

FIG. 13 is a graph plotting a comparison of the oil recovery as a function of injected pore volume of $CO_2$ for the secondary and tertiary GAGD Oil Recoveries in a Yates Reservoir Core, Yates Stocktank Crude Oil, Yates Reservoir Brine System This graph represents the results of GAGD performance at actual reservoir conditions of pressure and temperature using reservoir core, stocktank crude oil and reservoir brine. In other experiments in our laboratory, this rock-fluids system has been demonstrated to be oil-wet in nature. Therefore, both the immiscible and miscible floods performed quite well (as expected in oil-wet systems) with oil recoveries exceeding 80% ROIP in all four cases. As before, the tertiary $CO_2$ floods displayed delayed oil production compared to secondary $CO_2$ floods.

EXAMPLE 7

GAGD Process Performance Evaluation Using a Visual Glass Model

Figure 14:
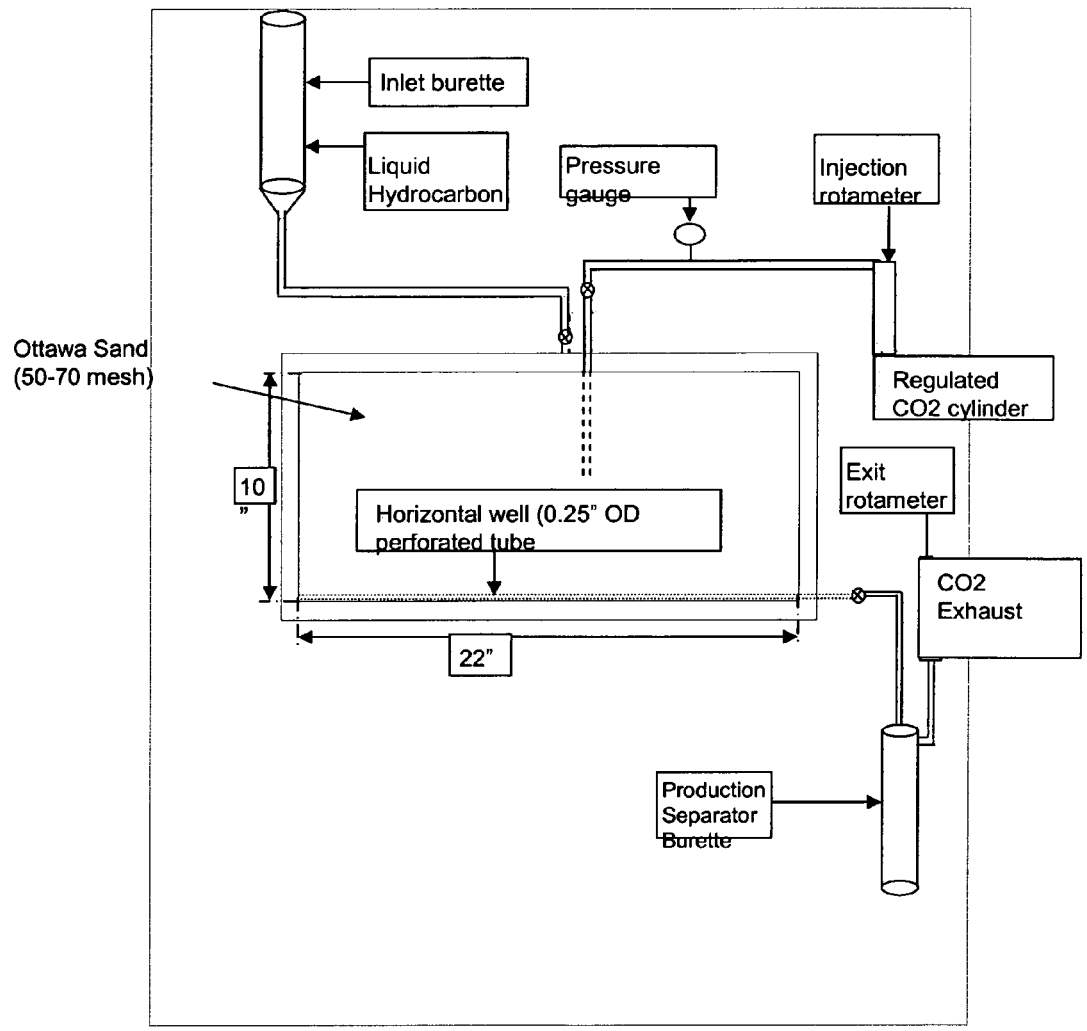
FIG. 14 is a schematic diagram of an experimental apparatus used to evaluate the affects of injection height, the density contrast between the fluids and Huff-and-Puff injection on the GAGD process performance.

To evaluate the affects of injection height, the density contrast between the fluids and Huff-and-Puff injection (i.e., where the same horizontal well at the bottom of the payzone is used intermittently for $CO_2$ injection as well as for oil production) on the GAGD process performance, experiments were conducted using a visual glass model. The visual glass model was made by sealing two glass plates together, and filling the glass model with 50-70 mesh Ottawa sand. The sandpack was 10 in high, 22 in long with a width of 0.5 in. A perforated tube having an outside diameter of 0.25 in was used to simulate a horizontal producer well. The perforated tube was placed at the bottom of the model to simulate the horizontal producer in the GAGD process. The experimental apparatus is schematically shown in FIG. 14. The vertical gas injection well was placed with its tip at the desired location within the sandpack. After packing the sand in the model, its porosity and permeability were determined by flowing water through-it. Next, the model was flooded with dyed n-decane from the top (to be gravity stable) until no more water was produced from the model. Next, $CO_2$ gas was injected at the desired location at a controlled pressure and flowrate from a regulated gas cylinder. A time-lapse digital camera, connected to a personal computer, was used to capture the images of the model throughout the experiment while the volumes of produced water and n-decane were monitored.

Figure 15:
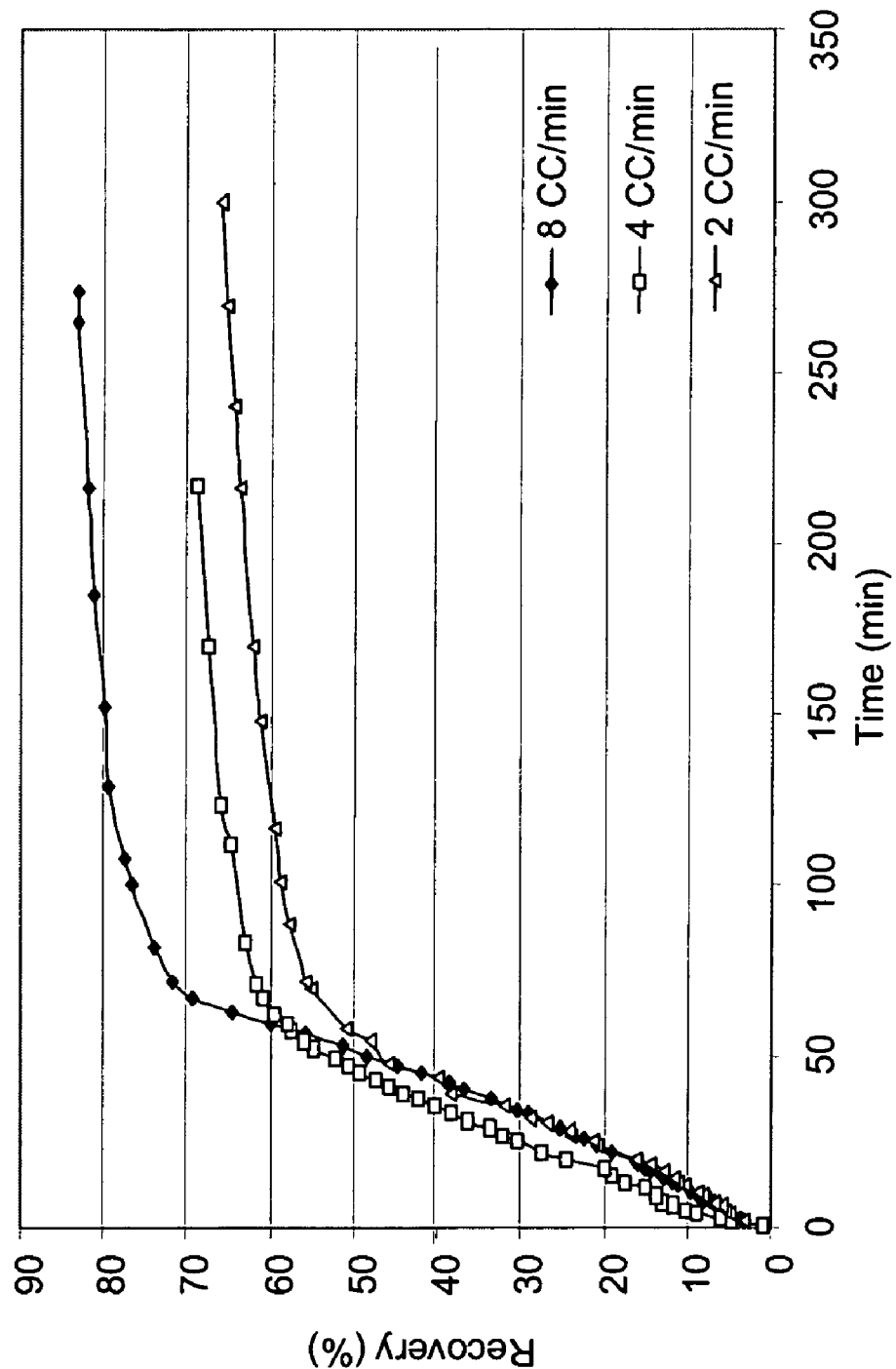
FIG. 15 is a graph comparing the effects of $CO_2$ injection rates on oil recovery using the GAGD process.
Figure 16:
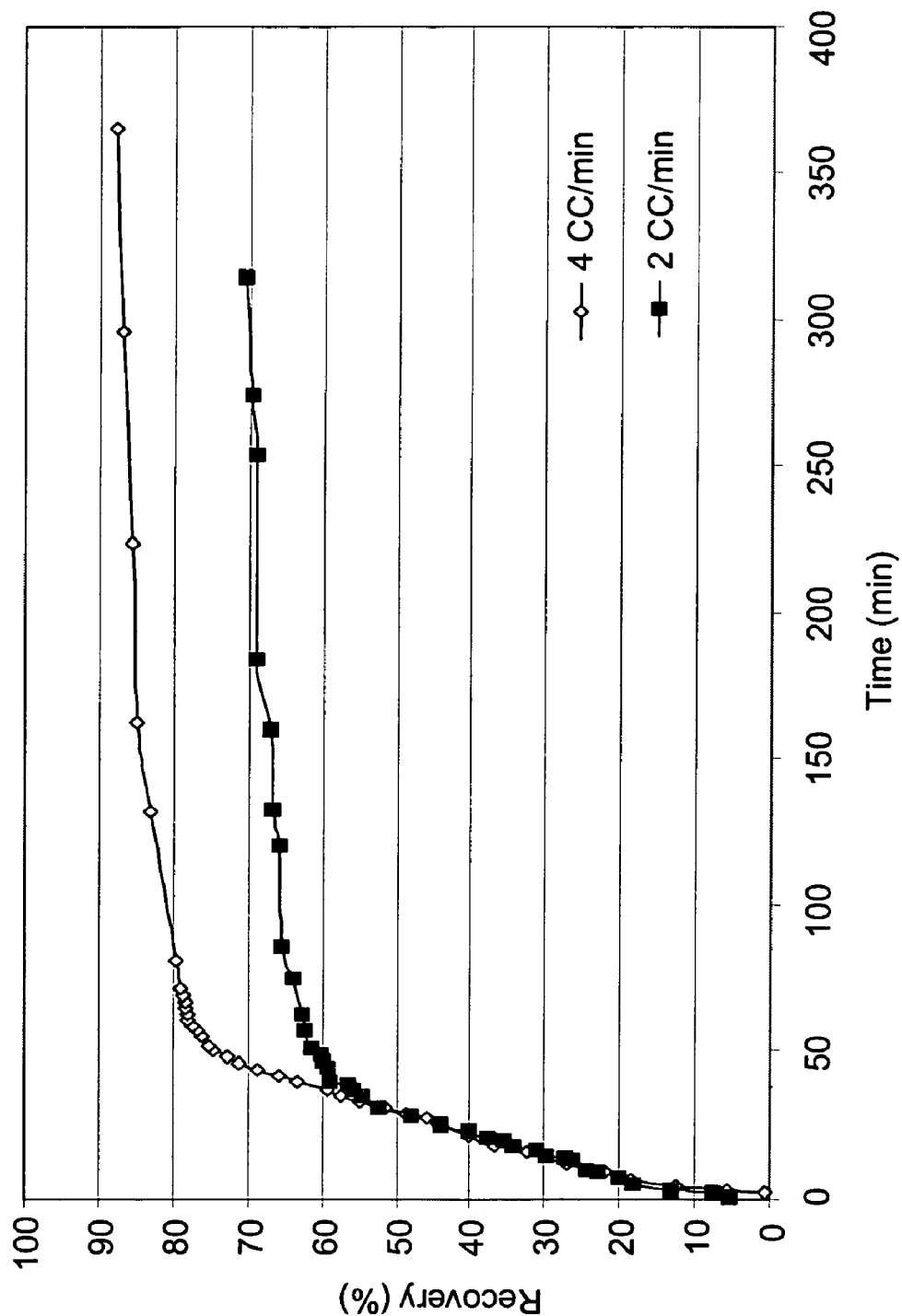
FIG. 16 is a graph comparing the effects of CO injection on oil recovery 5 in from the horizontal producer using the GAGD process.
Figure 17:
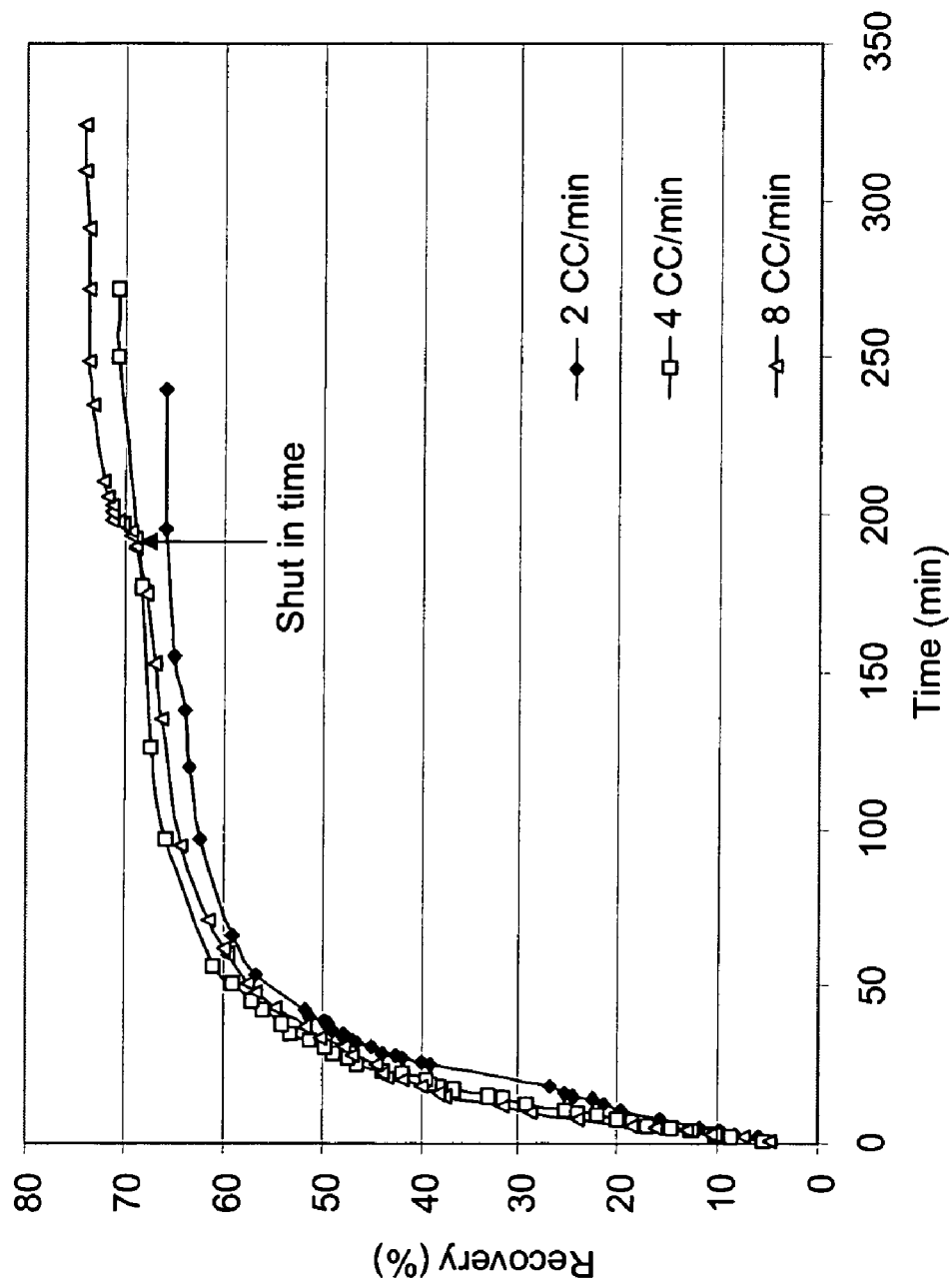
FIG. 17 is a graph comparing the effects of $CO_2$ injection on oil recovery 7.5 in from the horizontal producer using the GAGD process.

The effect of the $CO_2$ injection rate on GAGD oil recovery at an injection point, which is 2.5 in above the horizontal well, is shown in FIG. 15. GAGD oil recoveries at. $CO_2$ injection points of 5 in and 7.5 in from the horizontal producer are shown in FIGS. 16 and 17, respectively.

Figure 18:
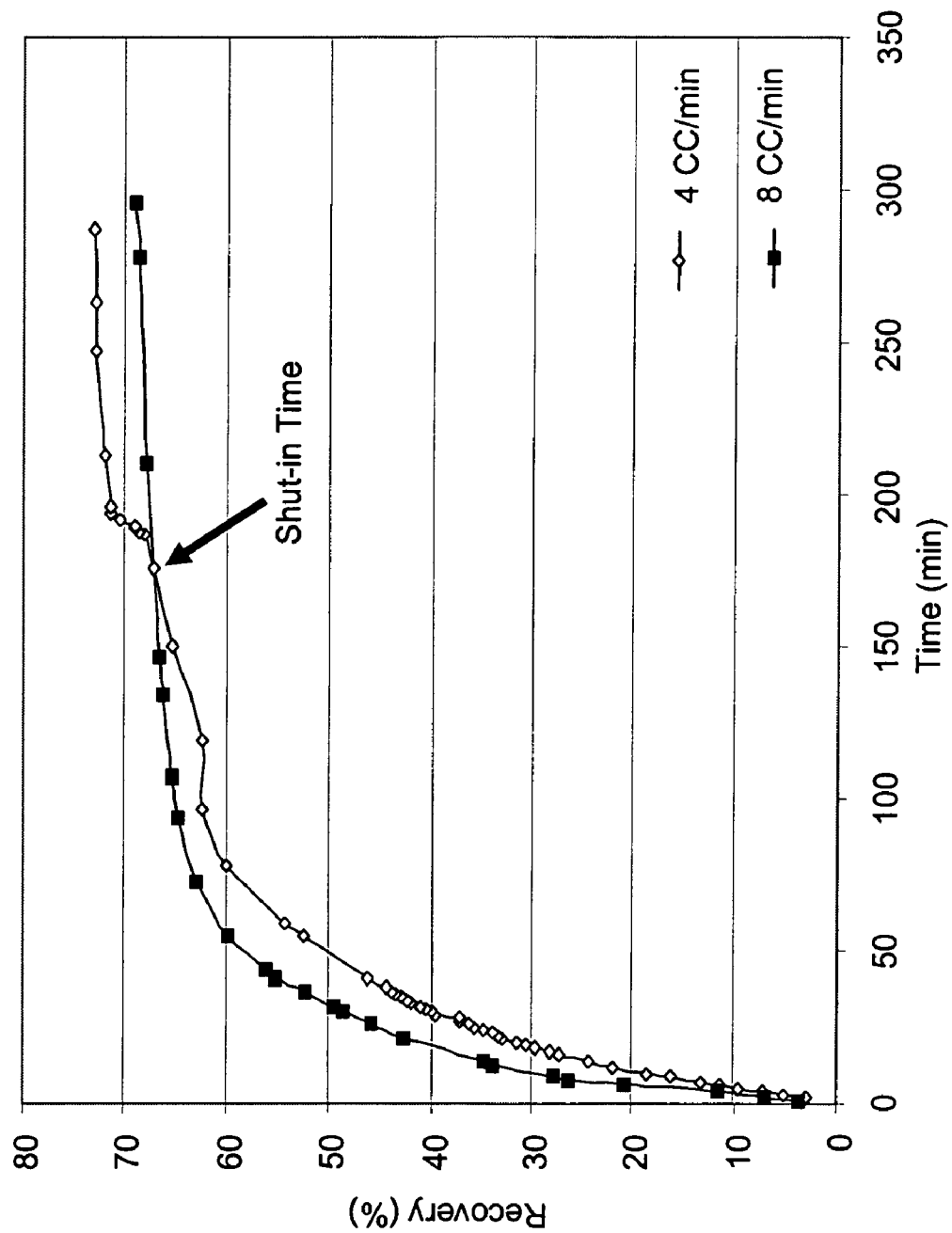
FIG. 18 is a graph plotting oil recovery as a function of time when injecting $CO_2$ at the top of the pay zone at injection rates of 4 cc/min and 8 cc/min.

FIG. 18 is a graph plotting oil recovery as a function of time when injecting $CO_2$ at the top of the pay zone at an injection rate of 4 cc/min and 8 cc/min. FIGS. 15-18 clearly indicate a consistent trend of increasing oil recovery with increasing $CO_2$ injection rate. By comparing the peak oil recoveries in these graphs, it can be seen that injecting $CO_2$ at the midpoint of the payzone (see FIG. 16) yielded the best recoveries, compared to injecting gas at any other distance above the horizontal producer.

Figure 19:
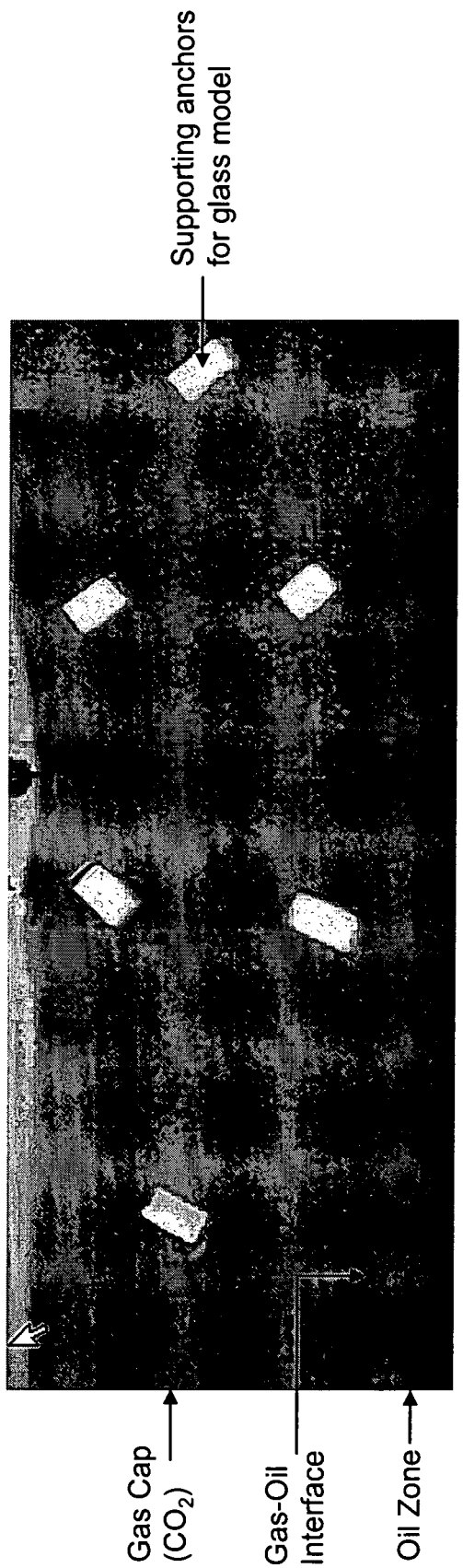
FIG. 19 is an image depicting phase segregation in a visual model during one embodiment of the GAGD process.

On an average, the $CO_2$ immiscible gravity drainage recovered 68% to 88% OOIP in the visual model. FIG. 19 depicts phase segregation in the visual model during $CO_2$ GAGD. Formation of a gas cap is clearly demonstrated at the top of the image. A gas-oil interface occurs towards the middle of the image, right above the oil zone. The rectangles are supporting anchors for the glass model.

EXAMPLE 8

Effect of Vertical Fractures on GAGD Oil Recoveries

Physical Model

A series of secondary mode gas displacement experiments were conducted using a physical model to determine the effects of vertical fractures on the GAGD performance. The vertical fractures were simulated by placing a mesh box inside the physical model, and then packing the model with a porous media made from 0.15 mm glass bead packs or 0.13 mm sand. The physical model parameters and the resulting GAGD oil recoveries are summarized in Tables 5 and 6, respectively for fractured and unfractured porous media.

TABLE 5

| Model Parameters | CP-S-WW-13-1-F | CP-S-WW-13-2-F | CP-S-OW-13-2-F | CP-S-OW-15-1-F |
|---|---|---|---|---|
| Gas | $N_2$ | $N_2$ | $N_2$ | $N_2$ |
| Wettability State | Water-wet | Water-wet | Oil-wet | Oil-wet |
| P (psig) | 4 | 4 | 4 | 4 |
| Rate (cc/min) | N/A | N/A | N/A | N/A |
| INITIAL CONDITIONS | | | | |
| $D_g$ (mm) | 0.13 | 0.13 | 0.13 | 0.15 |
| Pore Volume (cc) | 565.0 | 587.5 | 587.8 | 547.0 |
| Oil Flood Water (cc) | 323.7 | 363.7 | 380.2 | 468.7 |
| OOIP (cc) | 323.7 | 363.7 | 380.2 | 468.7 |
| Porosity φ (%) | 39.1 | 40.7 | 40.7 | 37.9 |
| $S_{wc}$ (%) | 42.7 | 38.1 | 35.3 | 14.3 |
| $S_{oi}$ (%) | 57.3 | 61.9 | 64.7 | 85.7 |
| GAS INJECTION | | | | |
| Oil Produced (cc) | 241.5 | 259.0 | 313.7 | 430.7 |
| Recovery (% OOIP) | 74.6 | 71.2 | 82.5 | 91.9 |

TABLE 6

| Model Parameters | CP-S-WW-13-1 | CP-S-OW-13-1 | CP-S-OW-13-3 | CP-S-WW-15-1 | CP-S-OW-15-1 | CP-S-OW-15-2 |
|---|---|---|---|---|---|---|
| Gas | $N_2$ | $N_2$ | $N_2$ | $N_2$ | $N_2$ | $N_2$ |
| P (psig) | 4 | 4 | 4 | 4 | 4 | 4 |
| Rate (cc/min) | N/A | N/A | N/A | N/A | N/A | N/A |
| $D_g$ (mm) | 0.13 mm silica sand | 0.13 mm silica sand | 0.13 mm silica sand | 0.15 mm glass bead packs | 0.15 mm glass bead packs | 0.15 mm glass bead packs |
| INITIAL CONDITIONS | | | | | | |
| Pore Volume (cc) | 524 | 528 | 571.5 | 558 | 476 | 504.0 |
| Oil Flood Water (cc) | 362.8 | 357.8 | 475.5 | 372.8 | 347.7 | 455.5 |
| OOIP (cc) | 362.8 | 357.8 | 475.5 | 372.8 | 347.7 | 455.5 |
| Porosity φ (%) | 36.5 | 36.5 | 39.6 | 38.6 | 32.9 | 34.9 |
| $S_{wc}$ (%) | 30.8 | 32.2 | 16.8 | 33.2 | 27.0 | 9.6 |
| $S_{oi}$ (%) | 69.2 | 67.8 | 83.2 | 66.8 | 73.0 | 90.4 |
| GAS INJECTION | | | | | | |
| k (Darcy) | 4.7 | 4.9 | 7.3 | 8.1 | 4.2 | 5.3 |
| $N_B$ | N/A | 6.6E−06 | 9.1E−06 | N/A | 6.3E−06 | 7.5E−06 |
| $N_C$ | N/A | 3.1E−07 | 5.3E−06 | N/A | 3.0E−07 | 5.7E−07 |
| $N_G$ | N/A | 20.9 | 17.0 | N/A | 21.3 | 15.8 |
| Oil Produced (cc) | 242.0 | 278.0 | 351.9 | 271.0 | 273.3 | 380.8 |
| Recovery (% OOIP) | 66.7 | 77.7 | 74.0 | 72.7 | 78.6 | 83.6 |

Figure 20B:
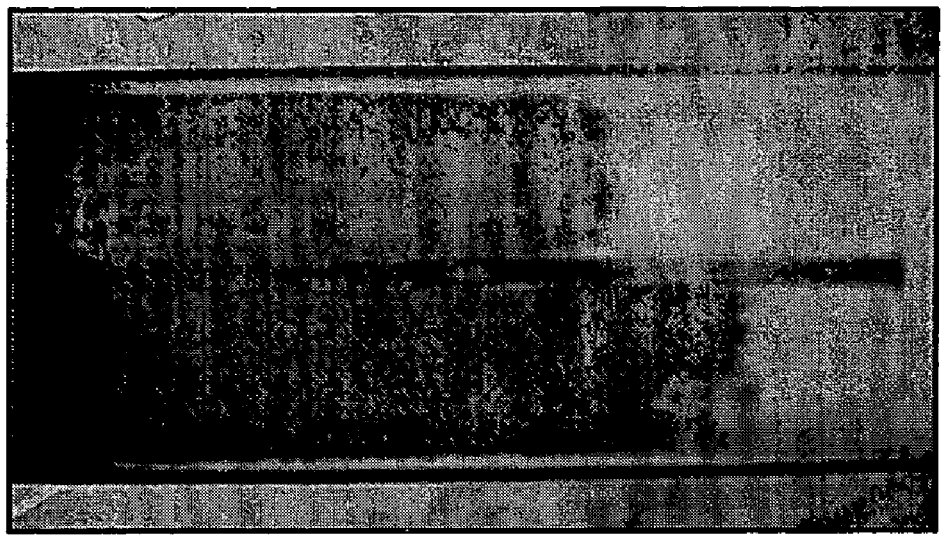
FIG. 20B is an image depicting an oil-wet porous medium during oil flooding using one embodiment of the GAGD process.
Figure 20A:
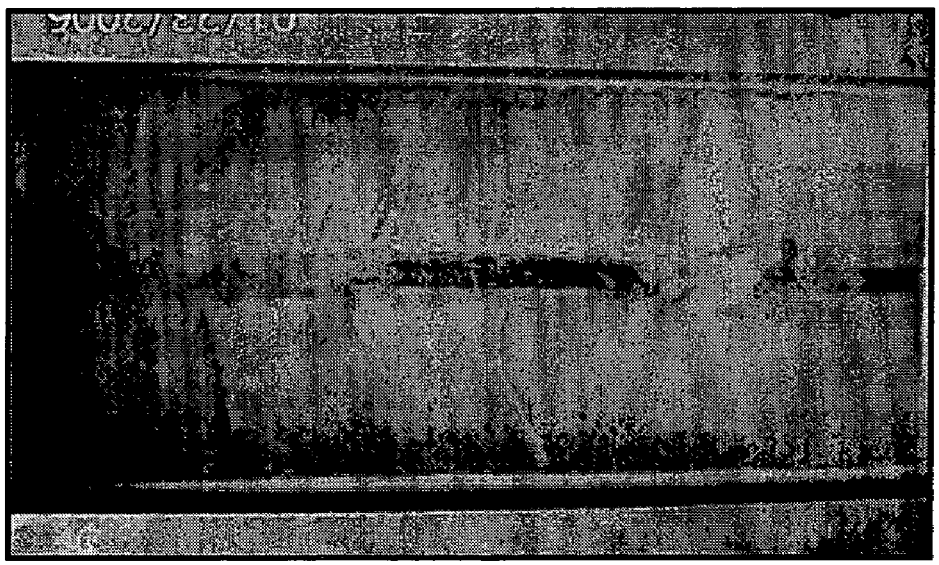
FIG. 20A is an image depicting a water-wet porous medium during oil flooding using one embodiment of the GAGD process.

FIGS. 20A and 20B are photographs depicting a water-wet porous medium and an oil-wet porous medium during oil flooding, respectively. The wettability state of the porous media was visually confirmed during the oil flooding part of the experimental procedure. The water-wet porous media, as shown in FIG. 20A, consistently displayed a "mottled" appearance (i.e., the oil did not displace the water uniformly resulting in a swept red area speckled with unswept whiter portions). The oil-wet porous media, as shown in FIG. 20B, consistently. displayed a characteristic homogeneously-red area, which indicated that the water was uniformly displaced to allow water saturation when n-decane was injected.

Figure 21:
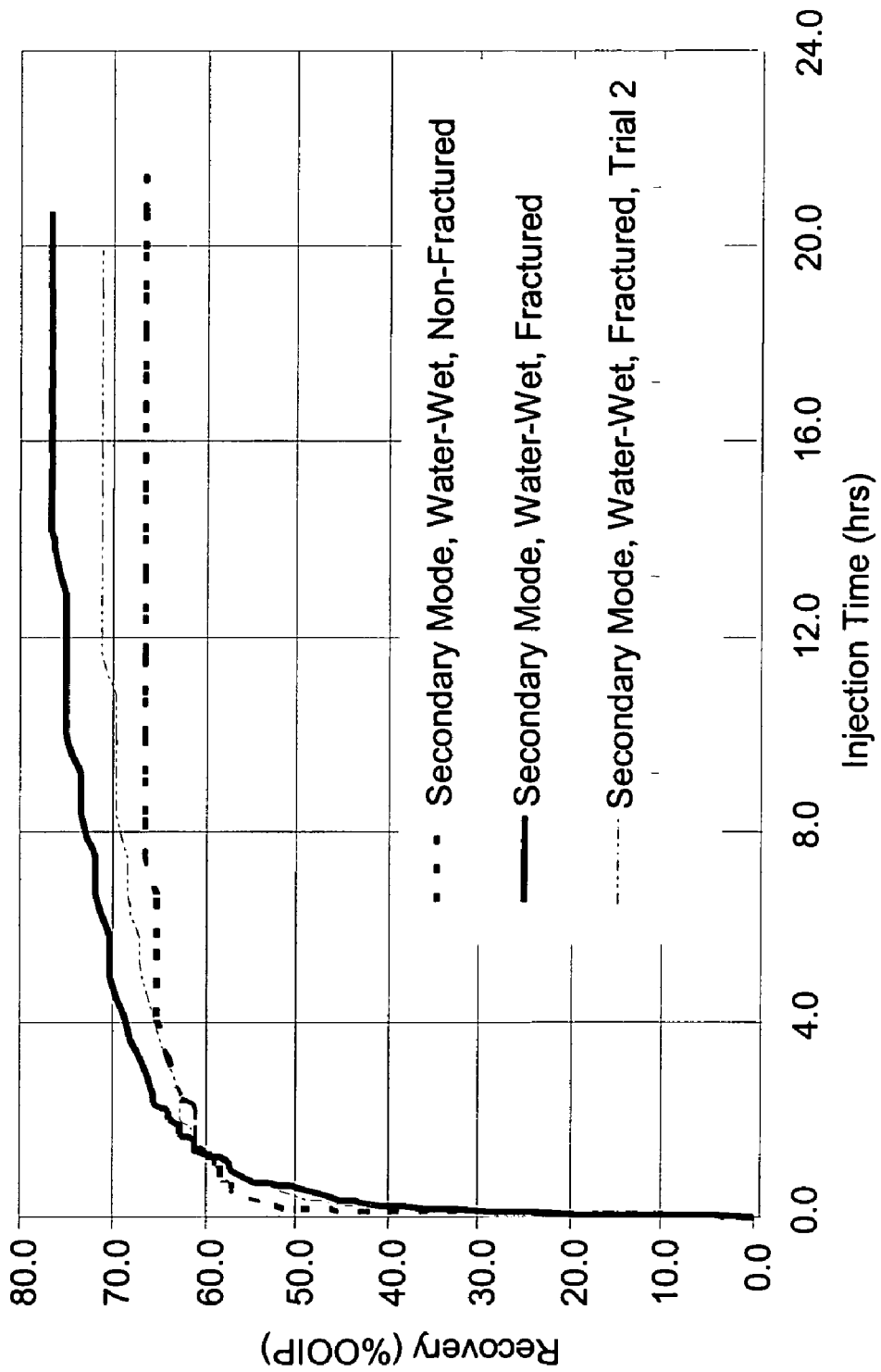
FIG. 21 is a graph comparing the effects of a non-fractured and fractured reservoir on oil recovery as a function of time using one embodiment of the GAGD process.
Figure 22:
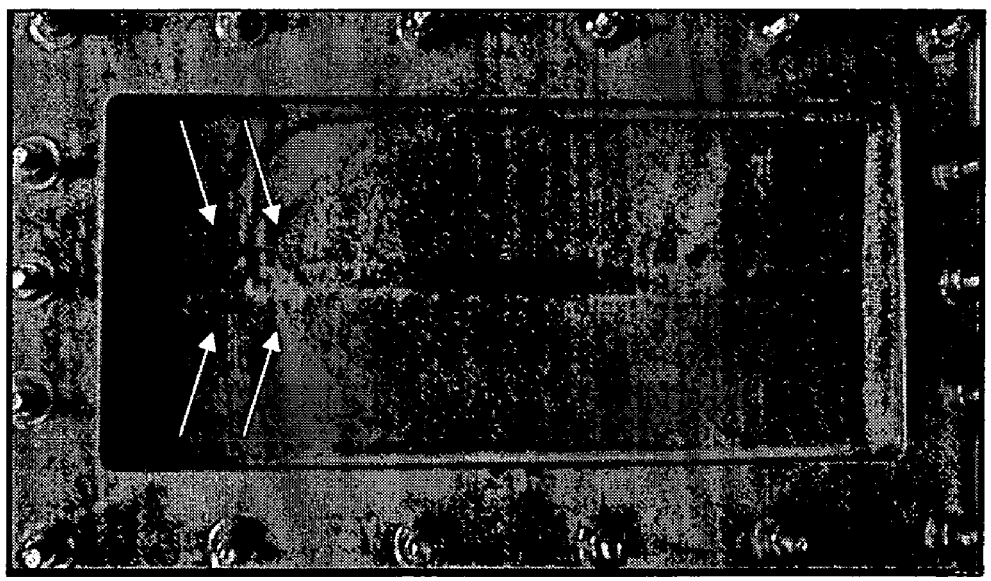
FIG. 22 is an image depicting injected gas pushing oil into a fracture located in the center using-one embodiment of the GAGD process.

The presence of a vertical fracture in the physical model improved the GAGD oil recovery in the water-wet porous media, as shown in FIG. 21. The average incremental increase in oil recovery was 6.2% OOIP. The increase in oil recovery was due to the presence of the. fracture, which performed as a low resistance conduit for the flow of oil, thus enhancing the oil recovery by gas injection. The injected gas pushed oil present in the matrix into the fracture, thereby creating an easier way for the oil to drain downwards through the porous medium, as shown in FIG. 22.

Figure 23:
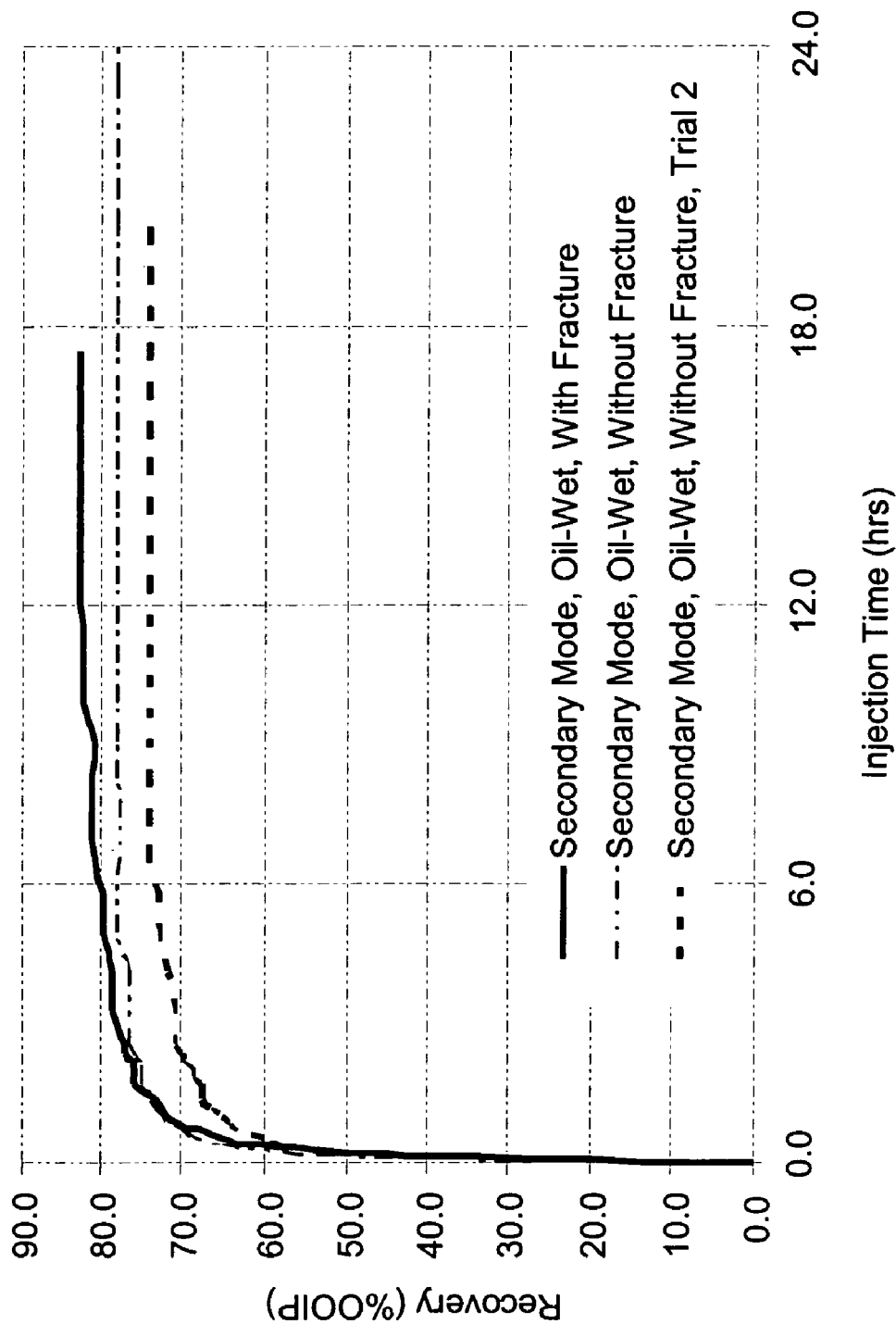
FIG. 23 is a graph comparing the effects of an oil-wet media with and without a vertical fracture on the recovery of oil using one embodiment of the GAGD process Recovery in oil-wet cases filled with 0.13 mm silica sand, respectively.
Figure 24:
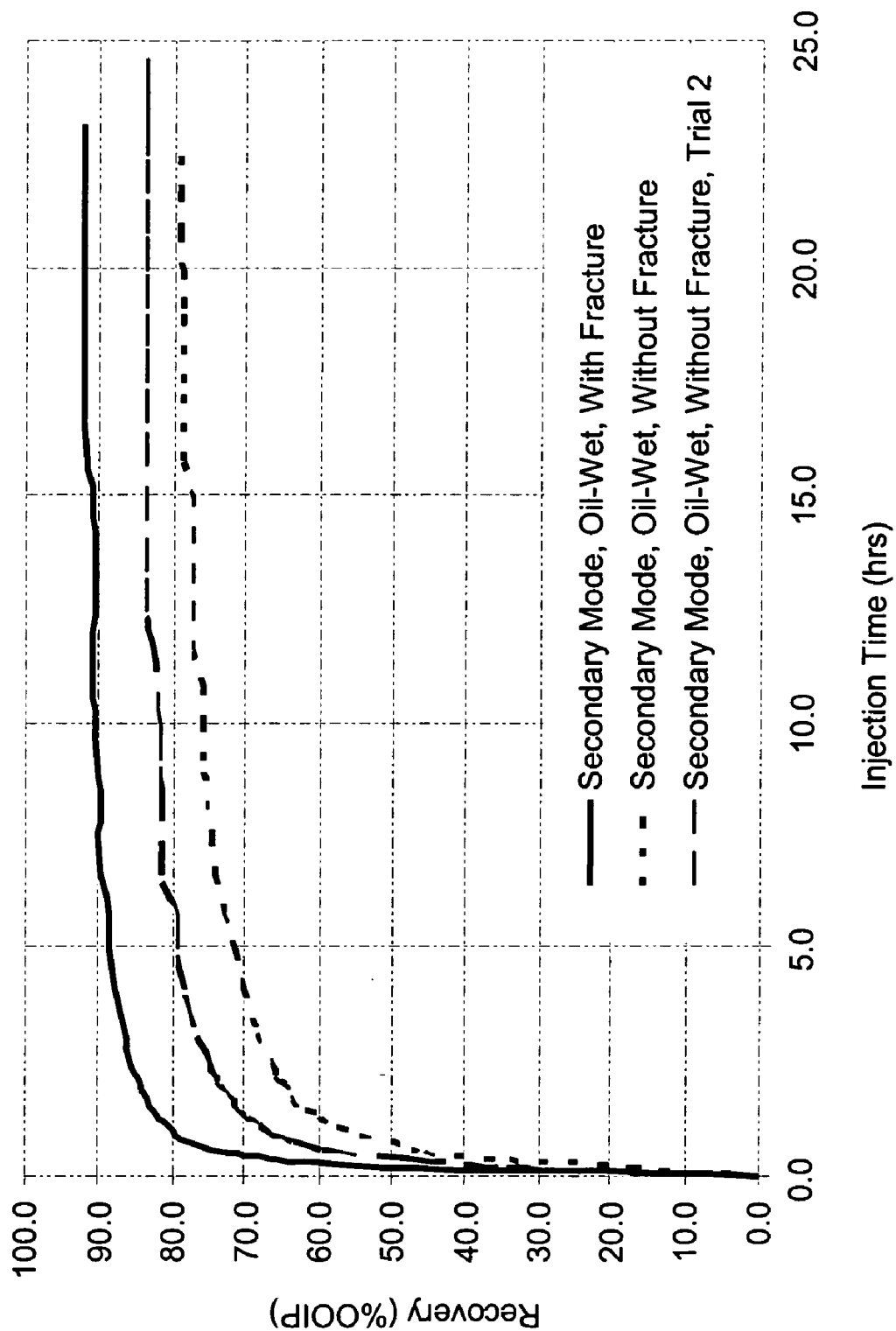
FIG. 24 is a graph comparing the effects of an oil-wet media with and without a vertical fracture on the recovery of oil using one embodiment of the GAGD process Recovery in oil-wet cases filled with 0.15 mm glass bead packs, respectively

FIGS. 23 and 24 are graphs comparing the effects of an oil-wet media with and without a vertical fracture on GAGD Recovery in oil-wet cases filled with 0.13 mm silica sand and 0.15 mm glass bead packs, respectively. On average, the incremental oil recovery in the oil-wet media containing 0.13 mm silica sand, as shown in FIG. 23, was 6.7% OOIP. The incremental oil recovery in the oil-wet media containing 0.15 mm glass bead packs, as shown in FIG. 24, was 6.7% OOIP, and the increase in the oil recovery was 10.8% OOIP for the 0.15 mm glass bead packs. As shown in FIGS. 23 and 24, the case containing a vertical fracture outperformed the cases without a vertical fracture.

The overall comparison of the results summarizing the GAGD incremental oil recoveries in fractured porous media compared to unfractured porous media for both water-wet and for oil-wet systems are shown in Table 7. As shown in Table 7, the oil recoveries were higher in the fractured porous media than the non-fractured porous media. In addition, the vertical fracture improved the oil recovery by about 7.9% OOIP.

TABLE 7

| | Oil Recovery (% OOIP) | |
|---|---|---|
| Description of Experiment | Actual | Incremental over Non-fractured |
| CP secondary fractured water-wet 0.13 mm | 72.9 | 6.2 |
| CP secondary fractured oil-wet 0.13 mm | 82.5 | 6.7 |
| CP secondary fractured oil-wet 0.15 mm | 91.9 | 10.8 |

Corefloods

To examine the effect of vertical fractures on GAGD oil recoveries, two sets of miscible and immiscible secondary GAGD coreflooding laboratory experiments were conducted using similar operating conditions as before (500 psi and 72° F. for immiscible and 2500 psig and 72° F. for miscible mode). The first set of experiments was carried out using a 1-ft long unfractured Berea sandstone core. The second set of experiments was carried out used the same Berea sandstone core, but sliced longitudinally along the axis to generate a vertical fracture. The fluids used in these experiments were n-decane (oil phase), Yates reservoir brine (water phase) and $CO_2$ (gas phase). The unfractured Berea core was first sliced vertically in the middle, and then assembled using highly permeable sand (rounded glass beads) filling and MIM-WIPES® for capillary contact to generate an end-to-end vertical fracture with a fracture permeability of about 15 Darcy and a matrix permeability of about 300 mD.

Figure 25:
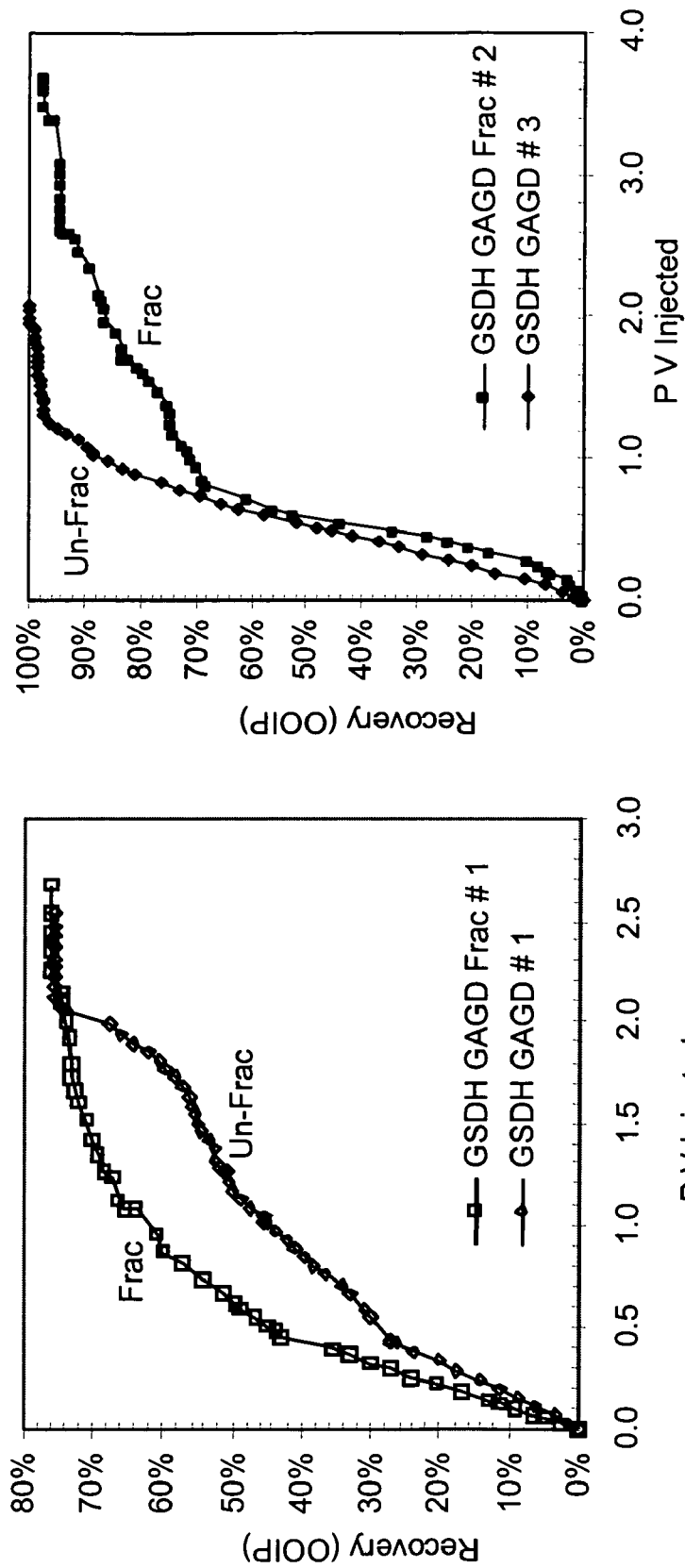
FIG. 25A is a graph comparing the differences in oil recovery of immiscible secondary between a vertical fracture reservoir and an unfractured reservoir using one embodiment of the GAGD.
FIG. 25B is a graph comparing the differences in oil recovery of miscible secondary between a vertical fracture reservoir and an unfractured reservoir using one embodiment of the GAGD.
Figure 26:
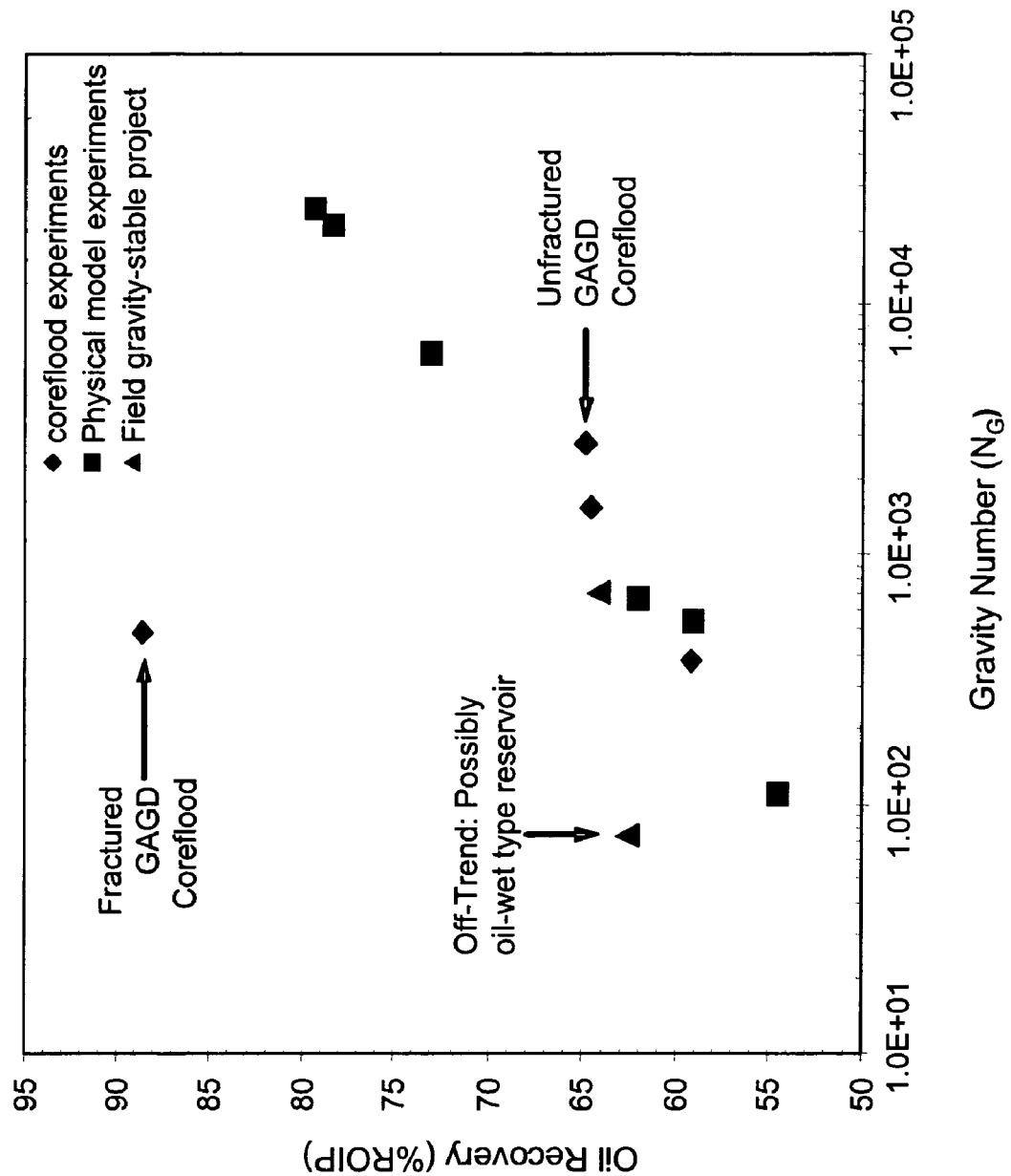
FIG. 26 is a graph depicting the correlation of immiscible oil recoveries from fractured and unfractured laboratory corefloods, physical model experiments, and field gravity-stable projects to a dimensionless gravity number.

The novel GAGD process was insensitive to the detrimental effects of vertical, high permeability fractures encountered in fractured reservoirs. In the immiscible GAGD process, as shown in FIG. 25A, the presence of vertical fractures seemed to increase the rate of oil recovery. This inference is further supported by the analysis of the dominant reservoir mechanics, where the immiscible oil recoveries from various laboratory corefloods, physical model experiments, and field scale projects were correlated to a dimensionless gravity number, as shown in FIG. 26. The data point for the fractured immiscible GAGD coreflood, as shown in FIG. 26, substantially deviates from the other experimental data points of the GAGD floods in non-fractured porous media due to high oil recovery obtained in the fractured GAGD coreflood.

The miscible fractured GAGD flood demonstrated consistent performance when compared to the unfractured coreflood until gas breakthrough, as shown in FIG. 25B. Even though the fractured core system requires higher pore volume of gas injection, the similarity in the ultimate oil recoveries further substantiates the observations, as in the immiscible fractured corefloods, that the presence of fractures is not detrimental to oil recovery in the GAGD process. It is well known in the art that the widely practiced gas injection processes in the field such as the WAG process yields very low oil recoveries in fractured reservoirs. By contrast, the most conservative performance estimates of the novel GAGD process out-perform the highest known WAG recoveries.

Nomenclature $D_g$=Diamter of galssbeads or sand grains
K=permeability
v=fluid velocity
ρ=fluid density
l=characteristic length
Ī=length of trapped oil volume
P=Pressure
$P_c$=capillary pressure
$S_{wc}$=Connate water saturation
$S_{oi}$=Initial oil saturation
μ=characteristic viscosity
Δ=differential of that quantity
Subscripts
M=model
P=prototype The complete disclosures of all references cited in this specification are hereby incorporated by reference. Also incorporated by reference is the following paper presented at a conference by the inventor: Gas Assisted Gravity Drainage (GAGD) Process for Improved Light Oil Recovery," on Apr. 17-21, 2004. In the event of an otherwise irreconcilable conflict, however, the present specification shall control.

What is claimed:

1. A process for producing oil from a subterranean, unfractured, oil-wet, hydrocarbon-bearing reservoir having a payzone; said process comprising the steps of:
    (a) injecting a gas into the subterranean, unfractured, oil-wet, hydrocarbon-bearing reservoir through one or more injection wells in an amount sufficient to induce downward oil sweeping effects throughout the reservoir, without increasing water saturation in the reservoir; and
    (b) removing displaced hydrocarbons from the reservoir using one or more horizontal producer wells adapted to evacuate a liquid comprising oil from the payzone to the surface;
wherein the one or more injection wells are positioned between the top of the payzone and the top of the one or more horizontal producer wells, and wherein the one or more horizontal producer wells are positioned near the bottom of the payzone.

2. The process as recited in claim 1, wherein a separate gas zone is formed above the hydrocarbons.

3. The process as recited in claim 1, wherein the gas is selected from the group consisting of natural gas, methane, ethane, propane, carbon dioxide, nitrogen, air, and mixtures of these gases.

4. The process as recited in claim 1, wherein the gas is carbon dioxide.

5. The process as recited in claim 1, wherein the subterranean hydrocarbon-bearing reservoir is selected from the group consisting of sandstone, limestone, and dolomite.

6. The process as recited in claim 1, wherein said process further comprises forming a gas zone extending from the top of the reservoir to a position near the top of the one or more horizontal producer wells by injecting the gas into the reservoir at a position near the top of the reservoir; and wherein said gas zone is formed as a result of gravity segregation of the gas.

7. The process as recited in claim 1, wherein the gas is nitrogen.

8. The process as recited in claim 1, wherein a separate gas zone is not formed.

9. The process as recited in claim 8, wherein the gas is selected from the group consisting of natural gas, methane, ethane, propane, carbon dioxide, nitrogen, air, and mixtures of these gases.

10. The process as recited in claim 8, wherein the gas is carbon dioxide.

11. The process as recited in claim 8, wherein the subterranean hydrocarbon-bearing reservoir is selected from the group consisting of sandstone, limestone, and dolomite.

12. The process as recited in claim 8, wherein the gas is nitrogen.

* * * * *